United States Patent
Follis

(10) Patent No.: US 9,692,601 B2
(45) Date of Patent: *Jun. 27, 2017

(54) AUTOMATICALLY PREVENTING UNAUTHORIZED SIGNATORIES FROM EXECUTING ELECTRONIC DOCUMENTS FOR ORGANIZATIONS

(71) Applicant: Adobe Systems Incorporated, San Jose, CA (US)

(72) Inventor: Benjamin David Follis, London (GB)

(73) Assignee: Adobe Systems Incorporated, San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/203,672

(22) Filed: Jul. 6, 2016

(65) Prior Publication Data

US 2016/0315775 A1 Oct. 27, 2016

Related U.S. Application Data

(63) Continuation of application No. 14/564,956, filed on Dec. 9, 2014, now Pat. No. 9,411,971.

(51) Int. Cl.
*H04L 29/06* (2006.01)
*H04L 9/32* (2006.01)
(Continued)

(52) U.S. Cl.
CPC ............ *H04L 9/3247* (2013.01); *G06F 21/31* (2013.01); *G06F 21/6209* (2013.01)

(58) Field of Classification Search
CPC ...... G06F 21/32; G06F 21/31; G06F 21/6209; H04L 63/12; H04L 29/08; H04L 9/3247
See application file for complete search history.

(56) References Cited

U.S. PATENT DOCUMENTS 7,698,230 B1 4/2010 Brown
8,468,144 B2 * 6/2013 Xu ..................... G06F 17/278
707/706

(Continued)

OTHER PUBLICATIONS

Bertino, Elisa, et al. "Selective and authentic third-party distribution of XML documents." IEEE Transactions on Knowledge and Data Engineering 16.10 (2004): 1263-1278.*

(Continued)

*Primary Examiner* — Chau Le
*Assistant Examiner* — Muhammad Chaudhry
(74) *Attorney, Agent, or Firm* — Kilpatrick Townsend & Stockton LLP

(57) ABSTRACT

In some embodiments, an electronic signature service automatically updates electronic documents to prevent execution by an unauthorized signatory. The electronic signature service can receive an electronic document to be electronically signed on behalf of an organization. The electronic signature service can retrieve organization data indicative of signatories that are authorized to electronically sign the electronic document. The organization data may be inaccessible to a first signatory that is associated with the document. The electronic signature service can determine from the organization data that the first signatory is not authorized to electronically sign the document. The electronic signature service can update the electronic document with a second signatory that is determined from the organization data as being authorized to execute the document. The electronic signature service can prevent the first signatory from executing the document and provide access to the electronic document by a computing device associated with the second signatory.

20 Claims, 7 Drawing Sheets

(51) Int. Cl.
*G06F 21/62* (2013.01)
*G06F 21/31* (2013.01)

(56) References Cited

U.S. PATENT DOCUMENTS

| | | | | |
|---|---|---|---|---|
| 2002/0099938 | A1* | 7/2002 | Spitz | H04L 9/3247 |
| | | | | 713/155 |
| 2005/0120217 | A1* | 6/2005 | Fifield | G06F 21/645 |
| | | | | 713/176 |
| 2006/0143157 | A1* | 6/2006 | Landsman | G06F 17/2705 |
| 2007/0277042 | A1* | 11/2007 | Dietl | G06F 21/64 |
| | | | | 713/176 |
| 2007/0282927 | A1* | 12/2007 | Polouetkov | G06F 17/30011 |
| 2008/0281735 | A1* | 11/2008 | Allin | G06Q 10/06 |
| | | | | 705/34 |
| 2013/0263283 | A1* | 10/2013 | Peterson | G06F 21/6218 |
| | | | | 726/28 |
| 2015/0095250 | A1* | 4/2015 | Lai | G06F 17/30702 |
| | | | | 705/320 |

OTHER PUBLICATIONS

Wu, Zhen-Yu, et al. "Redactable signatures for signed CDA documents." Journal of Medical Systems 36.3 (2012): 1795-1808.*
McIntosh, Michael, and Paula Austel. "XML signature element wrapping attacks and countermeasures." Proceedings of the 2005 workshop on Secure web services. ACM, 2005.*
Monnerat, Jean, Serge Vaudenay, and Martin Vuagnoux. "About machine-readable travel documents." RFID Security 2007. No. LASEC-CONF-2007-051. Springer, 2007.*
Mambo, Masahiro, et al. "Proxy signatures for delegating signing operation.", Retrieved from http://dl.acm.org/citation.cfm?id=238185 , Proceedings of the 3rd ACM conference on Computer and communications security. ACM, 1996.*
Goodchild, et al., "Business Contracts for B2B, ISDO", retrieved from http://ftp.informatick.rwth-aachen.de/Publications/CEUR-WS/Vol-30/paper8.pdf, Published 2000.
Notice of Allowance in related U.S. Appl. No. 14/564,956, dated May 18, 2016, 25 pages.

* cited by examiner

AUTOMATICALLY PREVENTING UNAUTHORIZED SIGNATORIES FROM EXECUTING ELECTRONIC DOCUMENTS FOR ORGANIZATIONS

CROSS-REFERENCE TO RELATED APPLICATION

This application is a continuation application of and claims priority to application Ser. No. 14/564,956, filed Dec. 9, 2014, now allowed, which is incorporated herein by reference in its entirety.

TECHNICAL FIELD

This disclosure relates generally to computer-implemented methods and systems and more particularly relates to automatically preventing unauthorized signatories from an organization, such as a corporation or other business entity, from executing an electronic document on behalf of the organization.

BACKGROUND

An electronic signature service is an online service that allows users to send electronic copies of contracts and other documents to one or more signatories. The electronic signature service may also allow individuals to access electronic copies of documents and to electronically sign the documents. For example, a user of an electronic signature service may upload a contract to the electronic signature service and specify individuals who must sign the contract. The electronic signature service may send a copy of the contract to the specified individuals, e.g., by email or other electronic means, or send an electronic notification to the specified individuals that the contract can be accessed and electronically signed via a website.

When routing electronic documents to an organization for signature, existing electronic signature solutions may not account for changes to the organizational structure or policies of an organization that govern which individuals in the organization have authority to execute the routed documents. For example, at a first point in time, certain individuals in an organization may have authority to sign or otherwise execute different documents on behalf of the organization. However, changes in personnel or organizational structure over time may change the authority of one or more of these individuals to execute documents on behalf of the organization (e.g., by individuals leaving the organization or being transferred to different roles in the organization having different signature authorities). Thus, an individual providing a contract or other document to the organization may provide the contract or other document for signature by individuals who are no longer authorized to sign the contract.

It may be desirable to use an electronic signature service to automatically modify electronic documents with authorized signatories or otherwise prevent signatories who have lost signature authority from executing documents.

SUMMARY

According to certain embodiments, an electronic signature service can automatically update an electronic document to prevent execution by an unauthorized signatory. The electronic signature service can receive an electronic document to be electronically signed on behalf of an organization. The electronic signature service can retrieve organization data that describes or otherwise indicates one or more signatories that are authorized to electronically sign the electronic document. The organization data may be inaccessible to a first signatory that is associated with the electronic document. The electronic signature service can determine from the organization data that the first signatory is not authorized to electronically sign the document. The electronic signature service can update the electronic document with a second signatory that is determined from the organization data as being authorized to execute the document. The electronic signature service can prevent the first signatory from executing the document and provide access to the electronic document by a computing device associated with the second signatory.

These illustrative embodiments are mentioned not to limit or define the disclosure, but to provide examples to aid understanding thereof. Additional embodiments are discussed in the Detailed Description, and further description is provided there.

BRIEF DESCRIPTION OF THE FIGURES

These and other features, embodiments, and advantages of the present disclosure are better understood when the following Detailed Description is read with reference to the accompanying drawings, where.

DETAILED DESCRIPTION

Figure 1:
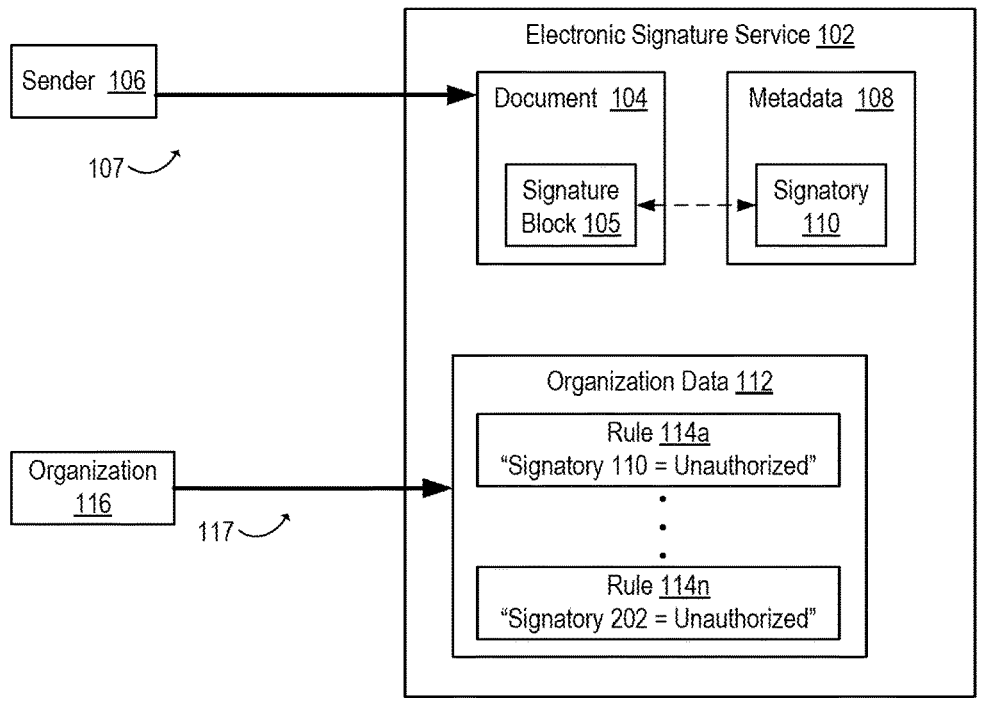
FIG. 1 is a modeling diagram depicting an example of an electronic signature service that can automatically prevent unauthorized signatories from executing an electronic document on behalf of an organization according to certain exemplary embodiments.

Computer-implemented systems and methods are disclosed for an electronic signature service that can automatically replace an unauthorized signatory of an electronic agreement with an authorized signatory for the electronic agreement. For example, when a first signatory has lost his or her signature authority for an electronic agreement and must be replaced with a second signatory, such modifications have previously required contacting one or more signatories to do so (e.g., requesting that a sender provide a new version of the agreement, sending a new version of the agreement to other signatories, etc.). Contacting other individuals when updating the signatories to a document can be particularly burdensome on both a data network and the newly added authorized signatory, because doing so requires additional electronic communications to and from various signatories and additional time and attention on their part. Contacting other signatories for approval can also be burdensome because doing so requires waiting for and receiving subsequent electronic communications that include the modified agreement.

These inefficiencies, delays, and burdens on signatories and data networks can be reduced or eliminated by utilizing organization data to automatically prevent unauthorized signatories from executing an electronic agreement and to update the agreement to identify the appropriate signatory (or set of signatories). The organization data can be provided or changed using the electronic signature service and any changes to the organization data can then be automatically applied to agreements that have not been executed on behalf of the organization. For example, an electronic signature service can automatically modify the agreement using the organization data to include the authorized signatory. The electronic signature service can do so without having to contact the authorized signatory or other unchanged signatories for approval and/or re-execution.

Using an electronic signature service to prevent an electronic agreement or other document from being executed by an unauthorized signatory can decrease the likelihood of agreements being executed that are unacceptable to the organization. For example, the electronic signature service may reduce or avoid the risk of a signatory entering into an agreement after his or her authority to do so has been revoked and thereby obligating the organization to comply with unacceptable agreements.

The following example is provided to help introduce the general subject matter of certain embodiments. An organization may subscribe to an electronic signature service. As part of the subscription process, the organization may provide data about its organizational structure and/or its authorized signatories to the electronic signature service. The organization may specify rules identifying different types of signature authorities with respect to the organization. At a first point in time, a given individual may possess the necessary authority to execute an electronic document on behalf of the organization. At a second point in time, the same individual may lose the necessary authority to execute an electronic document on behalf of the organization, either by leaving the organization or by being reassigned within the organization.

The electronic signature service can reference the organization data provided by the organization, including any rules specifying the individual(s) with signature authority for the organization, to prevent documents from identifying the individual as a signatory or otherwise preventing an unauthorized signatory from executing the document. In one example, the electronic signature service can respond to receiving updated organization data indicating that the individual no longer possesses signature authority by reviewing any existing, unsigned documents and removing the unauthorized signatory from the document. The electronic signature service may replace the removed signatory with a different authorized signatory that is identified using the organization data. In another example, after the individual has lost the authority to execute an agreement, the electronic signature service can receive a request by the individual that is indicative of the individual's intent to execute the agreement on behalf of the organization. The electronic signature service can respond to the request by referencing the most recent organization data to determine whether the individual is authorized to execute the agreement. The electronic signature service can determine, based on the organization data, that the individual is prohibited from executing the agreement, and can reject or otherwise disregard the individual's request to execute the agreement.

In accordance with some embodiments, the electronic signature service may be executed on a server system or other computing system and may receive documents to be electronically signed from (and send those documents to) other computing devices via a data network, such as the Internet. Data (e.g., organizational structures, rules, etc.) about organizations participating in the electronic signature service can be stored in a database or other suitable data structure accessible to the electronic signature service. The electronic signature service can determine that a current signatory for the document is not authorized to execute the document on behalf of the organization. The electronic signature service can do so using the data pertaining to the organization. The electronic signature service can prevent the document from being executed by the unauthorized signatory.

In some embodiments, the electronic signature service can also automatically identify an authorized signatory for the organization based on the data pertaining to the organization. The electronic signature service can modify the electronic document or data associated with the electronic document such that the electronic document is executable by the authorized signatory rather than the unauthorized signatory. The electronic signature service can electronically provide the document to a computing device associated with the authorized signatory, thereby allowing the authorized signatory to execute the document on behalf of the organization.

In some embodiments, the electronic signature service can be used to manage the automatic modification of multiple instances or versions of the electronic document that are provided to multiple signatories (e.g., an electronic document provided to hundreds, thousands, or millions of signatories that may involve hundreds, thousands, or millions of transactions between the organization and respective signatories external to the organization). For example, the electronic signature service can generate multiple versions of an electronic document that are similar to one another (e.g., multiple contracts in which the organization is a provider of standardized products or services). Each of the similar electronic documents can be between the organization and a respective signatory (or set of signatories). For example, multiple versions of a document that includes a sales document can be sent to multiple buyers. Organization data for the organization can be applicable to each version of the electronic document. The organization data can be altered to reflect changes in signature authority with respect to the various documents or versions of a document. The altered organization data can be used to automatically modify the multiple documents without resending the various electronic documents to the multiple signatories. For example, the altered organization data can be used by the electronic signature service to simultaneously or near-simultaneously modify hundreds, thousands, or millions of electronic documents without transmitting electronic communications involving these documents to either individuals within the organization (e.g., for a new authorized signatory to re-sign the agreement) or individuals external to the organization (e.g., new copies of the document with an updated signatory having appropriate signature authority).

As used herein, the term "electronic signature service" is used to refer to an application executable by a processing device, firmware, hardware, or any combination thereof that receives, provides, maintains, or otherwise accesses information about senders of documents, signatories for documents, contract, etc. that is sufficient to verify that the documents have been signed. In some embodiments, the electronic signature service can maintain information about electronic documents that is sufficient to legally enforce the terms of the documents. For example, an electronic signature service may store a document such as a contract as well as data indicating that one or more individuals have signed the contract. In some embodiments, an electronic signature service can automatically record and store details of a document's history, thereby allowing for auditing of the process by which the document was signed by various signatories and/or by which signature authority for the document was transferred between different signatories. In some embodiments, an electronic signature service can be hosted or otherwise implemented by a server or group of servers accessible via a data network (e.g., the Internet). In additional or alternative embodiments, an electronic signature service can be hosted or otherwise implemented by a stand-alone computing device.

Any suitable combination of hardware, software, firmware, etc. can be used to implement the workflow and or processes involved in the electronic signature service. In some embodiments, the electronic signature service can be an application that is executable by any suitable processing device. In other embodiments, the electronic signature service can include a combination of executable programming instructions and the processing device used to execute the instructions. In other embodiments, the electronic signature service can include a firmware for implementing the processes involved in the electronic signature service. In other embodiments, the electronic signature service can include a server system that can execute programming instructions for implementing the processes involved in the electronic signature and that can host the data used by the electronic signature service.

As used herein, the terms "electronically sign" or "electronically execute" are used to refer to any action by which an electronic copy of a document may be modified, or otherwise used, to indicate that a signatory has accepted and agreed to one or more provisions of the document. Electronically signing a document may have the same legal effect as printing a copy of the document and physically adding a signatory's signature to the document. Any suitable action can be used to electronically sign a document (perhaps depending on the law of the relevant jurisdiction). Examples of electronically signing a document include typing an individual's name in a certain field on the document, adding an electronic image of the individual's handwritten signature to the document, faxing or otherwise electronically transmitted a manually signed copy of the document to the electronic signature service, etc.

As used herein, the term "signatory" is used to refer to a person that is intended to or has signed a document and the term "authorized signatory" is used to refer to a signatory who is authorized (or possibly required) to sign a document in order for the document to be legally binding upon the person's organization.

As used herein, the term "electronically provide" is used to refer to any action by which an electronic copy of a document may be transmitted to a signatory or any electronic communication by which a signatory may be notified that a copy of the document is available for signature.

As used herein, the term "legally binding" is used to refer to a document requiring one or more legally enforceable actions by one or more individuals. For example, a document such as a contract may become legally binding when each party to the contract may institute a legal action in order to compel action by another party to the contract.

As used herein, the term "organization" is used to refer to an entity including one or more individuals organized for working collectively to achieve one or more common goals. Examples of an organization include business entities (e.g., small businesses, partnerships, sole proprietorships, corporations, etc.), government entities (e.g., government agencies, legislative bodies, military units, etc.), non-profit organizations, etc.

As used herein, the term "organizational structure" is used to refer to a manner in which areas of responsibility are allocated to individuals or groups of individuals in an organization. An organizational structure may be hierarchical (e.g., a corporation) or non-hierarchical (e.g., a partnership) and may designate positions, titles, roles, responsibilities, etc. of individuals or groups of individuals within the organization. In some embodiments, prior to receiving documents to be executed by the organization, an electronic signing service may receive an electronic document from an organization that identifies an organizational structure as well as the identities of individuals assigned to positions in the organizational structure and rules governing the signature authority for positions in the organizational structure.

As used herein, the term "officer" is used to refer to an individual having responsibility for or authority to perform one or more organizational operations, activities, goals, etc. For example, organizations such as corporations or military units may include officers appointed or otherwise selected to perform one or more actions on behalf of the organization. Such actions may include entering into contracts that legally bind a corporation or issuing an order directing a military unit to perform one or more collective tasks. In some embodiments, an officer may be an individual authorized to unilaterally perform one or more functions that legally bind the organization.

In additional or alternative embodiments, the electronic signature service can identify at least some of the authorized signatories by analyzing content of the document, even if the document's content does not include the names the authorized signatories in the document. The electronic signature service can determine one or more authorized signatories based on the analyzed content. In one example, the electronic signature service can determine that the analyzed content includes at least one reference to at least one function for which a department of the organization is responsible. The electronic signature service can identify one or more authorized signatories from the department. In another example, the electronic signature service can determine that the analyzed content references one or more functions for which one or more individuals having a specified role in the organization are responsible. For example, a corporation can include different roles with different signature authority, such as "in-house counsel" having authority to sign powers of attorney, "procurement managers" having signature authority to sign certain vendor agreements, etc. The electronic signature service can identify one or more authorized signatories by determining that the signatories have roles with the appropriate signature authority for the document.

As used herein, the term "department" is used to refer to a sub-division of an organization responsible for performing at least one function or overseeing at least one type of activity that is specific to that sub-division. In some embodiments, a department can be identified by reference to a hierarchy for an organization. For example, departments for a specific branch of government may include individual agencies under the responsibility of a particular office of the executive branch, geographic sub-divisions (e.g., counties) under the responsibility of an office having responsibility for a larger geographic area (e.g., a state), etc. In other embodiments, a department can be identified by an area of responsibility without requiring a hierarchy for the organization. For example, departments for a professional organization such as a law firm may be identified by specialized practice areas such as litigation, patent prosecution, etc.

As used herein, the term "role" is used to refer to an individual having a responsibility or authority in an organization by virtue of the individual having a certain position in the organization. For example, a role in a corporation may be a legal secretary. Although the specific individuals having the role of "legal secretary" may change, any responsibility or authority associated with the role would remain constant regardless of the particular individual assigned to the role.

In additional or alternative embodiments, the electronic signature service may provide one or more auditing functions for documents signed via the service. For example, the electronic signature service may generate and record audit information that describes how the electronic signature service used an organizational structure, rules provided by the organization, and/or other organization data to identify authorized signatories for the document. For example, the electronic signature service may log auditing data such as the date on which organization data (e.g., organizational structure, rules, etc.) was provided, the identity of the individual who provided the organization data to the electronic signature service, which rules from the organization data were used to identify authorized signatories, which rules from the organization data were used to identify unauthorized signatories, etc. In additional embodiments, the electronic signature service can provide the audit information to one or more entities identified in the document to be signed (e.g., the parties to a contract).

Referring now to the drawings, FIG. 1 is a modeling diagram depicting an example of an electronic signature service 102 that can automatically prevent unauthorized signatories from executing an electronic document 104 on behalf of an organization 116.

Figure 9:
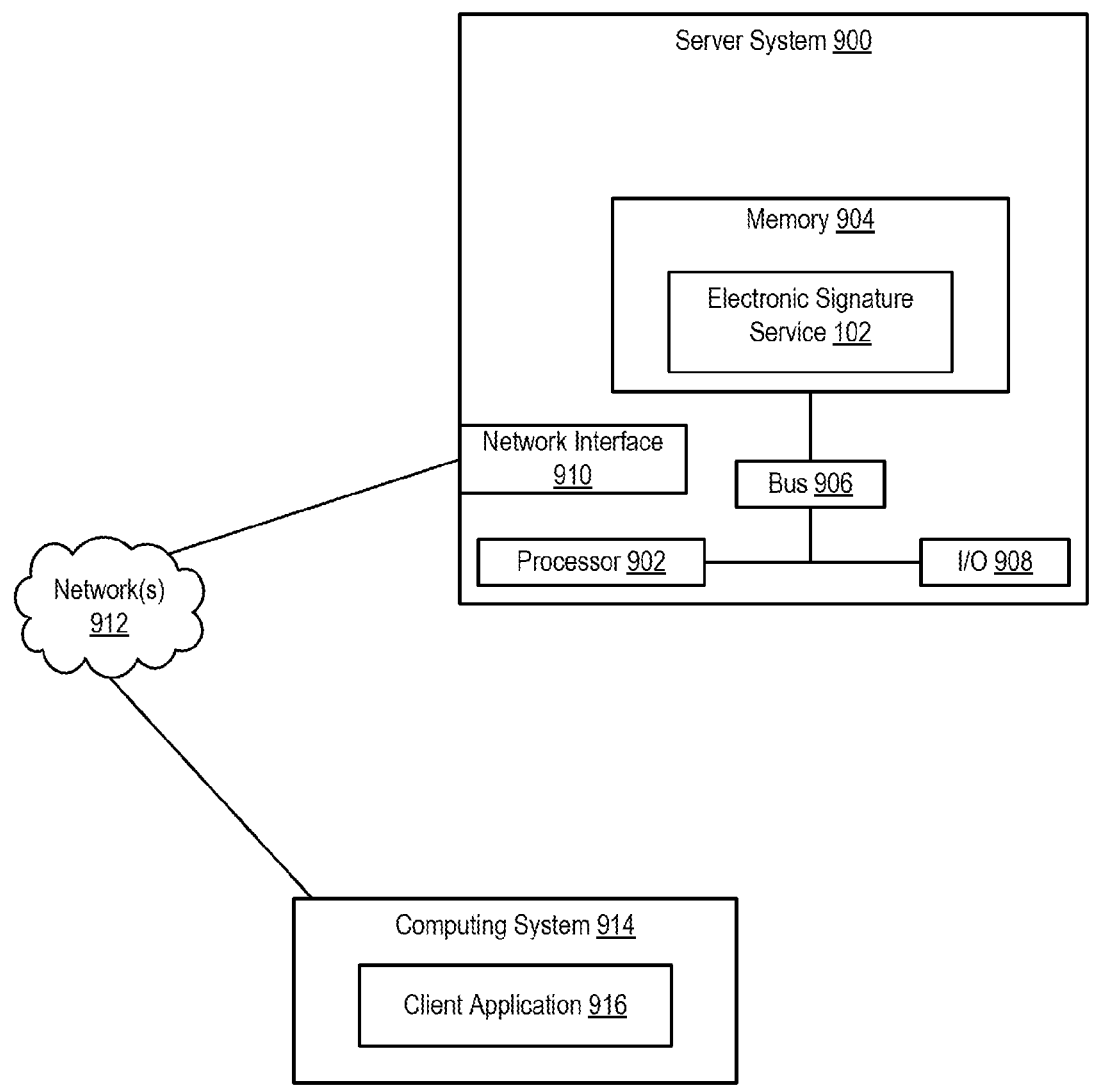
FIG. 9 is a block diagram depicting an example of a server system for implementing certain embodiments.

The electronic signature service 102 can be hosted or otherwise implemented by any suitable server system and can be accessed by other computing devices via any suitable data network (see, e.g., FIG. 9). For example, the electronic signature service 102 may be accessed by one or more computing devices operated by a sender 106 of an electronic document 104 and one or more computing devices operated by a recipient of the electronic document 104. These recipients can include one or more individuals from the organization 116 and/or one or more individuals outside the organization 116. In one example, the electronic signature service 102 may be executed on a server system accessible by other computing devices via the Internet (e.g., via a Web-based or other network interface). In another example, the electronic signature service 102 may be executed on a server system accessible by other computing devices via an electronic mail or fax communication system.

A sender 106 can thus provide the electronic document 104 to the electronic signature service 102 via any suitable electronic communication 107. One example of a sender 106 is an individual or entity within the organization 116, such as an individual who is or acts on behalf of an officer, manager, director, vice-president, chief executive officer, or other individual in the organization 116 having authority perform actions that are legally binding on the organization 116. Another example of a sender 106 is an individual or entity external to the organization 116, such as a vendor doing business with the organization. An electronic communication 107 can performed in any suitable manner, such as, for example, uploading the electronic document 104 via a website for accessing the electronic signature service 102, sending the electronic document 104 in an e-mail attachment to a server that executes or is in communication with the electronic signature service 102, faxing the electronic document 104 to a server that executes or is in communication with the electronic signature service 102, etc.

The electronic document 104 can include or otherwise be associated with metadata 108. The metadata 108 can identify one or more signatories 110 for the electronic document 104. The metadata 108 can also identify associations between one or more signatories 110 and one or more signature blocks 105 or other fields in the electronic document 104.

The metadata 108 can be associated with the electronic document 104 in any suitable manner. In some embodiments, the metadata 108 can be embedded within the electronic document 104 by the electronic signature service 102 or another suitable application. In additional or alternative embodiments, the metadata 108 can be stored separately from the electronic document 104. For example, the metadata 108 may be stored in a non-transitory computer-readable medium accessible to the electronic signature service 102 using a database or other suitable data structure. Copies of the electronic document 104 provided to signatories can include an identifier for the record in the database or other data structure in which the metadata 108 is stored. The electronic signature service 102 can use the identifier to access the metadata 108 from the database or other data structure. Storing the metadata 108 separately from the electronic document 104 can keep the metadata 108 inaccessible to a signatory of the electronic document 104 other than the sender 106. The sender 106 can transmit at least some of the metadata 108 to the electronic signature service 102 via a suitable electronic communication.

The electronic signature service 102 can store organization data 112 describing an organization 116. The organization data 112 can be inaccessible to one or more signatories of an electronic document 104. The organization data 112 can include any data that can be used by the electronic signature service 102 to prevent unauthorized signatories from executing the electronic document 104 on behalf of the organization and to identify authorized signatories from the organization 116 for executing the electronic document 104. Examples of the organization data 112 include data describing the structure of the organization, data identifying the individuals involved in or associated with the organization, data specifying the authority of different individuals and/or positions, departments, etc. to enter into contracts or perform other actions on behalf of the organization, data identifying one or more individuals whose previous authority to act on behalf of the organization 116 has been revoked, etc.

The organization data 112 can be provided to the electronic signature service 102 via any suitable process. In one example, an organization 116 may subscribe to the electronic signature service 102 in order to facilitate the execution of documents on behalf of the organization. The organization 116 may provide the organization data 112 to the electronic signature service 102 in an electronic communication 117 during the subscription process or at some point subsequent to the subscription process. In another example, the electronic signature service 102 can be configured to automatically determine at least some of the organization data 112 via publically available records (e.g., records of business entities registered with the secretary of state or other appropriate government entity) stored in public or private databases accessible by the electronic signature service 102. The electronic signature service 102 can retrieve information by obtaining the publically available information via a suitable electronic communication 117 from an electronic computing device that can provide access to the publically available information.

The electronic signature service 102 can automatically prevent unauthorized signatories from executing the electronic document 104. The electronic signature service 102 can do so by accessing one or more rules 114a-n of the organization data 112 that are stored on a non-transitory computer-readable medium accessible to the electronic signature service 102. The rules 114a-n can specify or otherwise identify signature authority to execute documents on behalf of the organization that is held by individuals or other entities or groups of individuals or entities.

In some embodiments, the rules 114a-n can include one or more mappings from sets of expressions to client accounts of the electronic signature service 102. An expression can include any logical expression that can be evaluated by a processing device of the electronic signature service 102. Examples of these expressions include "contract tagged 'procurement,'" "contract received from bob@merchant.xyz," etc. The electronic signature service 102 can receive one or more mappings in the organization data 112 and store these mappings using a database or other suitable data structure in a non-transitory computer-readable medium accessible to the electronic signature service 102.

One or more of the rules 114a-n can indicate that a given client account has lost the authority to execute one or more electronic documents 104. For example, the electronic signature service 102 can receive input via a data network identifying a change to the authority of a client account associated with a signatory 110. The electronic signature service 102 can compare data obtained from the input that identifies an unauthorized signatory 110 with one or more mappings of expression sets to client accounts associated with documents accessible via the electronic signature service 102. For any documents having mappings matching the identified signatory 110, the electronic signature service 102 can update the organization data 112 to prevent the signatory 110 from executing at least some electronic documents 104 on behalf of the organization 116. For instance, the electronic signature service 102 can create or modify a rule 114a based on the received input. The rule 114a can specify that the signatory 110 is an unauthorized signatory with respect to one or more electronic documents 104 and/or one or more types of electronic documents 104.

In some embodiments, the rule 114a can include or be associated with auditing information identifying one or more reasons for removing or otherwise changing the signature authority of the signatory 110. In one example, the rule 114a may include or be associated with auditing information indicating that the signatory 110 has left the organization 116. In another example, the rule 114a may include or be associated with auditing information indicating that the signatory 110 has changed to a different role or position with the organization 116 that removes or otherwise changes the signature authority of the signatory 110. For example, certain electronic documents 104 may be associated with sales, and a signatory 110 may be been transferred out of the sales department. The rule 114a can be updated with auditing information indicating that the signatory 110 has been removed from a group of client accounts that are associated with the sales department and are thereby authorized to execute documents 104 relating to sales.

The electronic signature service 102 can subsequently determine from the rule 114a that if an electronic document 104 is received or identified that includes a signature block 105 associated with the unauthorized signatory 110, the signatory 110 is to be prevented from executing the electronic document 104. In some embodiments, preventing the unauthorized signatory 110 from executing the electronic document 104 can involve disabling a client account associated with the unauthorized signatory 110. In additional or alternative embodiments, preventing the unauthorized signatory 110 can involve notifying the sender 106 that the signatory 110 is no longer authorized to execute an electronic document 104.

In additional or alternative embodiments, preventing the unauthorized signatory 110 from executing the document 104 can involve replacing a signature block 105 with a different signature block that is associated with a different signatory that is authorized to execute the electronic document 104 on behalf of the organization 116. Replacing a signature block 105 with a different signature block that is associated with an authorized signatory can involve automatically assigning signatories to the electronic document 104 by adding, modifying, or replacing previously identified signatories in the electronic document 104 or by otherwise associating data with the electronic document 104 that identifies the signatories.

Figure 2:
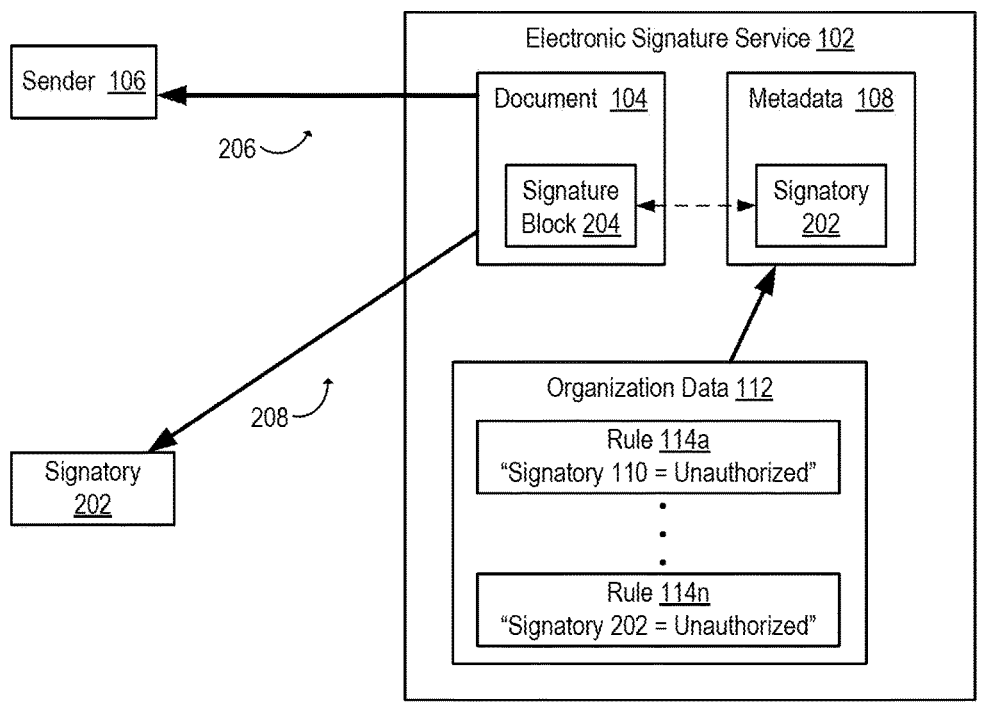
FIG. 2 is a modeling diagram depicting the electronic signature service updating a signature block for the electronic document based on organization data pertaining to the organization according to certain exemplary embodiments.

For example, FIG. 2 is a modeling diagram depicting the electronic signature service 102 updating a signature block for the electronic document 104 based on the organization data 112 pertaining to an organization 116. In some embodiments, one or more of the rules 114a-n can specify or otherwise identify signature authority based solely on a corporate or other organizational structure for the organization 116. In additional or alternative embodiments, the rules 114a-n can specify signature authority based on a given circumstance (e.g., route all agreements from a specific customer or client to a specific sales manager, even if additional sales managers would otherwise have authority to sign the agreements). The electronic signature service 102 can generate signature blocks for each individual or groups of individuals that have authority to execute the documents, according to the rules 114a-n and/or other organization data 112.

In some embodiments, the electronic signature service 102 can configure a processing device to generate and send electronic communications for notifying one or more entities of an organization 116 that signature authority for one or more electronic documents 104 and/or one or more signatories 110 has changed. In one example, the electronic signature service 102 can generate electronic notifications for one or more of the signatories 110 and other entities in the organization 116 indicating that the electronic document 104 has been modified to remove signatory 110. In another example, the electronic signature service 102 can generate electronic notifications for one or more of the signatory 110 and other entities in the organization 116 indicating that signature authority for one or more types of electronic document 104 has been modified such that the signatory 110 is no longer authorized to execute these types of electronic documents 104.

For illustrative purposes, FIG. 2 depicts the electronic signature service 102 generating a single updated signature block 204. However, the electronic signature service 102 can additionally or alternatively determine that multiple authorized signatories 202 can execute the electronic document 104 rather than the unauthorized signatory 110. In some embodiments, the organization data 112 can identify multiple individuals or other entities in the organization that have responsibility for one or more functions of the organization (e.g., names and roles of officers of the organizations, organizational departments, etc.). In some embodiments, the electronic signature service 102 can generate appropriate signature blocks for multiple subsets of authorized signatories having the authority to execute the electronic document 104. For example, the electronic signature service 102 can generate a first set of signature blocks 204 for signatories 202 in a first subset of authorized signatories and generate a second set of signature blocks 204 for signatories 202 in a second subset of authorized signatories. In one example, the rules 114a-n for a particular organization 116 such as a corporation may specify that an electronic document 104 such as a contract may become legally binding upon either (1) a majority of board members signing the document or (2) both the president and the secretary of the corporation signing the document. The first set of signature blocks 204 may be signature blocks for the board members (i.e., the first set of signatories 202). The second set of signature blocks 204 may be signature blocks for the president and the secretary (i.e., second set of signatories 202). In another example, the rules 114a-n for a particular organization 116 may specify individuals who are responsible for one or more functions or other items identified in the electronic document 104 (e.g., a manager, director, vice president, senior vice president, etc.).

In some embodiments, multiple signature blocks 204 for multiple authorized signatories 202 can be included within the electronic document 104. In other embodiments, the electronic signature service 102 may generate a first copy of the electronic document 104 that includes a first signature block 204 for a first authorized signatory 202 and a second copy of the electronic document 104 that includes a second signature block 204 for a second authorized signatory 202. In additional or alternative embodiments, the electronic signature service 102 can modify a database such that a document identifier for a record corresponding to the electronic document 104 is associated with both (i) a first set of records in a first table that respectively correspond to a first set of signature blocks 204 and (ii) a second set of records in a second table that respectively correspond to a second set of signature blocks 204. Signatures received from sets of authorized signatories 202 can be stored in respective records corresponding to the sets of signature blocks 204. After a sufficient number of signatories have provided signatures to the electronic signature service 102, the electronic signature service 102 may use data stored in the database to generate a copy of the electronic document 104 with the appropriate signature blocks and the associated signatures.

The electronic signature service 102 can notify the signatory 202 that the electronic document 104 is available for signature via any suitable electronic communication 208. In some embodiments, the electronic signature service 102 can also notify the sender 106 that the electronic document 104 with the updated signature block 204 is available for signature via any suitable electronic communication 206. In some embodiments, the electronic communications 206, 208 can include copies of the electronic document 104 with the signature block 204. In one example, the electronic signature service 102 can send e-mails to one or both of the sender 106 and the signatory 202 with copies of the electronic document 104 having the signature block 204 as e-mail attachments. In another example, the electronic signature service 102 can transmit copies of the electronic document 104 having the signature block 204 via facsimile or other electronic communication channels to one or both of the sender 106 and the signatory 202. In other embodiments, the electronic communication 208 can notify one or both of the sender 106 and the signatory 202 without including copies of the electronic document 104. For example, the electronic signature service 102 can send electronic messages (e.g., e-mail, text message, etc.) that include a link to a website via which one or both of the sender 106 and the signatory 202 may access and sign the updated electronic document 104 using the electronic signature service 102. In other embodiments, the electronic communication 208 can include copies of the updated electronic document 104 with the signature block 204 as well as a link to a website or other network location via which one or both of the sender 106 and the signatory 202 may access and sign the electronic document 104 using the electronic signature service 102.

In some embodiments, the electronic signature service 102 may subsequently notify the sender 106 that a sufficient number of authorized signatories have signed the electronic document 104. For example, a sufficient number of authorized signatories 202 may electronically sign the electronic document 104 by suitable electronic communications. The electronic signature service 102 can notify the sender 106 via a suitable electronic communication that a sufficient number of the authorized signatories 202 (e.g., a specific signatory 202, a specific number of signatories 202, etc.) have signed the electronic document 104. In some embodiments, the electronic signature service 102 can use one or more processes to verify that the entity from which signatures were received is actually one of the authorized signatories 202. Any suitable process for verifying a signatory can be used. Examples of such processes include requiring the signatory 202 to provide one or more credentials or other authentication information (e.g., password, personal identification number, etc.) to the electronic signature service 102, requiring the signatory 202 to provide biometric data (e.g., a fingerprint) to the electronic signature service 102, verifying that the network identifier (e.g., an IP address) from which a signature is received is known to the electronic signature service 102 or belongs to a trusted domain, etc.

Any suitable electronic communications can be used to provide electronic signatures for the electronic document 104. In some embodiments, the electronic communications can include one or more signatories 202 accessing the electronic signature service 102 via a web site to add the electronic signatures to the electronic document 104. In additional or alternative embodiments, the electronic communications can include one or more signatories 202 sending copies of the electronic document 104 with electronic signatures to the electronic signature service 102 via suitable electronic communication channels (e.g., e-mail attachment, facsimile transmission, etc.).

Figure 3:
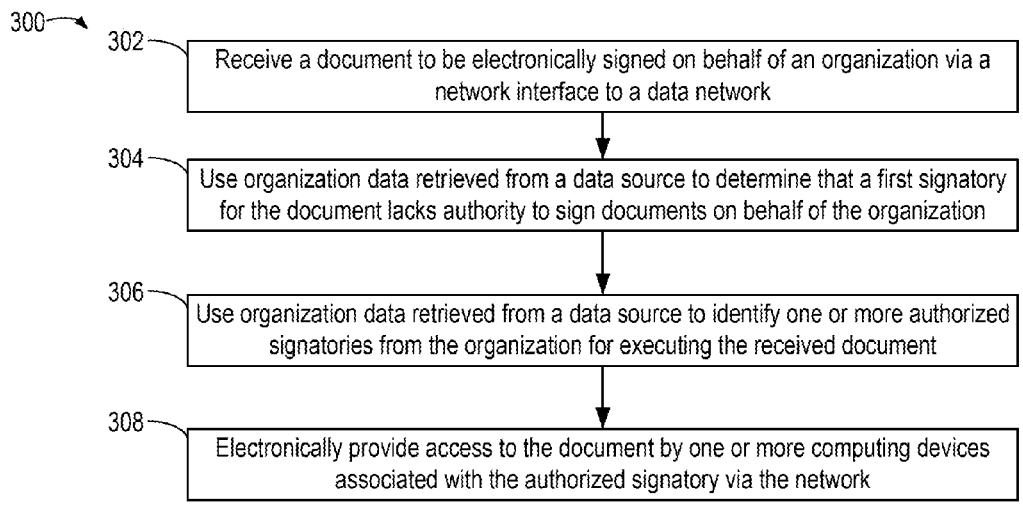
FIG. 3 is a flow chart illustrating an example of a method for replacing an unauthorized signatory with an authorized signatory for executing an electronic document on behalf of an organization according to certain exemplary embodiments.

Any suitable process can be used for replacing unauthorized signatories 110 of an electronic document 104 with authorized signatories 202. FIG. 3 is a flow chart illustrating an example of a method 300 for replacing an unauthorized signatory 110 with an authorized signatory 202 for executing an electronic document 104 on behalf of an organization 116. For illustrative purposes, the method 300 is described with reference to the implementation depicted in FIGS. 1 and 2. Other implementations, however, are possible.

The method 300 involves receiving an electronic document 104 to be electronically signed on behalf of an organization via a network interface to a data network, as depicted in block 302. The electronic signature service 102 can receive the electronic document 104 via any suitable data or communication network from a computing device operated by the sender 106. For example, the electronic signature service 102 can receive a suitable electronic communication 107 via a network interface to a data network. The electronic communication 107 can provide the electronic document 104 from the sender 106 to the electronic signature service 102, as described above with respect to FIG. 1.

The method 300 also involves determining that the first signatory lacks authority to sign documents on behalf of the organization, as depicted in block 304. For example, the electronic signature service 102 can be executed by a suitable processing device to access the organization data 112 for the organization 116. The organization data 112 can be selected from a database or other suitable data structure based on an identifier for the organization 116. The identifier for the organization 116 can be included in one or more electronic communications received from a computing device associated with the sender 106. In some embodiments, the sender 106 may be responsible for identifying the organization 116 to which the document is directed. In other embodiments, the electronic signature service 102 may be configured to identify (or attempt to identify) the organization 116 (e.g., by a keyword search of the electronic document 104) if the sender 106 does not otherwise specify it. The electronic signature service 102 can retrieve organization data 112 from a database or other suitable data structure stored in a computer-readable medium. In some embodiments, the electronic signature service 102 can access a data source, such as a database, in which the organization data 112 is stored and use the identifier for the organization 116 to retrieve the organization data 112. The organization data 112 can include, for example, data describing the organizational structure specified in the organization data 112 and rules 114*a-n*.

The electronic signature service 102 can use the accessed organization data 112 to determine whether sufficient signature authority is specified for the account corresponding to the signatory "Joe Snuffy" such that Joe Snuffy can execute the electronic document 104. For example, the electronic signature service 102 can compare the determined signature authority required for executing the electronic document 104 to the signature authority (if any) associated with the account for Joe Snuffy. The electronic signature service 102 can determine, based on the comparison, that the signature authority (if any) associated with the account for Joe Snuffy is insufficient to execute the electronic document 104. Additional details are described below with respect to FIG. 4 regarding how the electronic signature service 102 may determine that a given signatory 110 is not authorized to execute a given electronic document 104.

The method 300 also involves using organization data 112 retrieved from a data source to determine a second signatory from the organization 116 authorized for executing the received electronic document 104, as depicted in block 306. For example, the electronic signature service 102 can be executed by a suitable processing device to automatically identify or otherwise determine one or more authorized signatories for executing the electronic document 104. One or more authorized signatories can be identified or otherwise determined by referencing an organization structure specified in the organization data 112 and/or the rules 114*a-n* in the organization data 112.

The electronic signature service 102 can identify signatories having the appropriate signature authority for the electronic document 104 by performing one or more suitable algorithms or other processes using the organizational structure specified in the organization data 112 and/or the rules 114*a-n*. Examples of such algorithms or processes are described above with respect to FIG. 2 above and in greater detail below with respect to FIGS. 5-8.

The method 300 also involves electronically provides access to the electronic document 104 by the second signatory, as depicted in block 308. Any suitable electronic communication 208 can be used to provide the electronic document 104 to authorized signatory 202, as described above with respect to FIG. 2. For example, the electronic signature service 102 can transmit a copy of the electronic document 104 to the signatory 202 via a suitable data network and/or transmit a notification to the signatory 202 via a suitable data network that the electronic document 104 can be accessed via a specified website.

In some embodiments, the method 300 can be used to manage the automatic modification of multiple instances or versions of the electronic document 104 that are provided to multiple signatories (e.g., an electronic document provided to hundreds, thousands, or millions of signatories that may involve hundreds, thousands, or millions of transactions between the organization 116 and respective signatories external to the organization 116). For example, the electronic signature service 102 can generate multiple electronic documents (e.g., multiple versions of the electronic document 104) that are similar to one another (e.g., multiple contracts in which the organization is a provider of standardized products or services). Each of the similar electronic documents can be between the organization 116 and a respective signatory (or set of signatories) from multiple signatories involved in multiple transactions with the organization 116. For example, multiple versions of a document 104 that includes a sales document can be sent to multiple buyers. The organization data 112 can be applicable to each version of the electronic document 104. The organization data 112 can be inaccessible to at least some of the signatories involved in the multiple documents. In some embodiments, the organization data 112 for the multiple documents can be stored in a non-transitory computer-readable medium separately from the multiple electronic documents. The organization data 112 can be altered to reflect changes in signature authority with respect to the various documents. The altered organization data 112 can be used to automatically modify the multiple documents without resending the various electronic documents to the multiple signatories. For example, the altered organization data 112 can be used by the electronic signature service 102 to simultaneously or near-simultaneously modify hundreds, thousands, or millions of electronic documents without transmitting electronic communications involving these documents to either individuals within the organization 116 (e.g., for a new authorized signatory to re-sign the agreement) or individuals external to the organization (e.g., new copies of the document with an updated signatory having appropriate signature authority).

Figure 4:
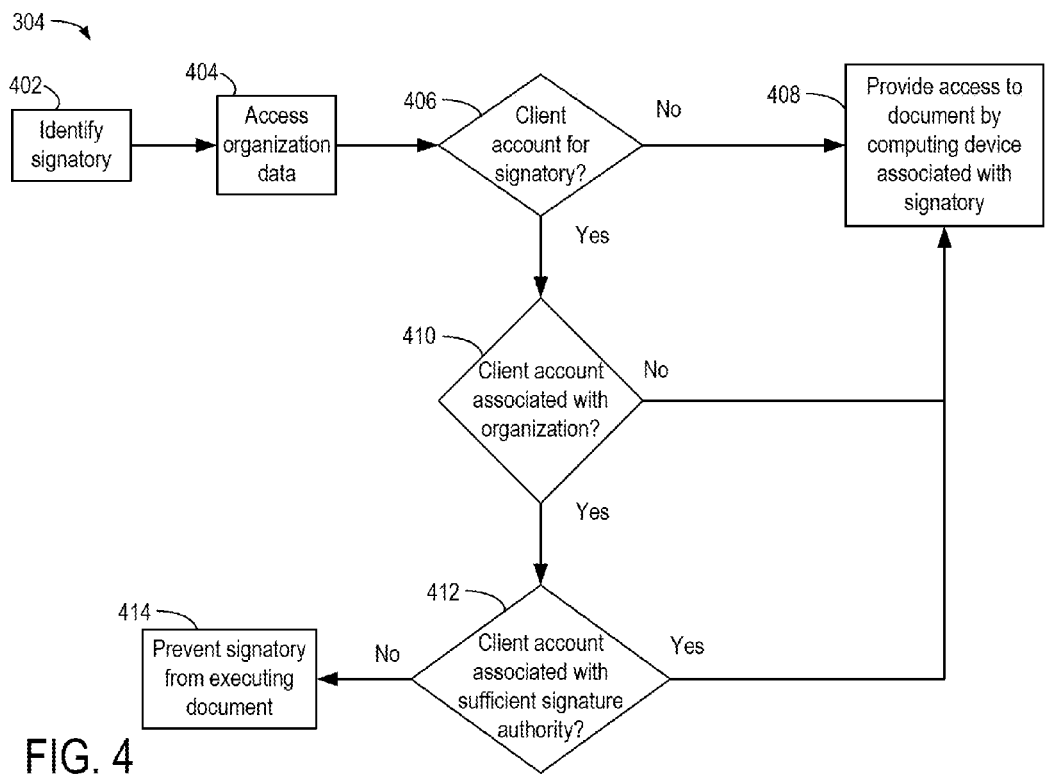
FIG. 4 is a flow chart illustrating an example of a method for automatically preventing an unauthorized signatory from executing an electronic document on behalf of an organization according to certain exemplary embodiments.

FIG. 4 is a flow chart illustrating an example of a method for automatically preventing an unauthorized signatory from executing an electronic document on behalf of an organization. For illustrative purposes, the method depicted in FIG. 4 is described as an example for implementing block 304 with reference to the exemplary implementation depicted in FIGS. 1-3. Other implementations, however, are possible.

The method for implementing block 304 involves identifying a signatory in the electronic document 104, as depicted in block 402. For example, a suitable processing device of the electronic signature service 102 can execute program code to perform one or more suitable algorithms for identifying a signatory in the electronic document 104. The signatory can be specified in or otherwise identifiable from metadata 108 stored in the document 104 or otherwise associated with the document 104. For example, the metadata 108 may include data specifying that a signatory 110 is a signatory to the document or may include data identifying a client account of the electronic signature service 102 associated with the signatory 110. Examples of data identifying a client account include a user name, an e-mail address, or other suitable identifier.

In some embodiments, identifying a signatory in the electronic document 104 can involve accessing metadata 108 embedded within the electronic document 104. In additional or alternative embodiments, identifying a signatory in the electronic document 104 can involve accessing metadata 108 associated with the electronic document 104 and stored separately from the document 104 in a non-transitory computer-readable medium accessible to the electronic signature service 102. For example, the electronic document 104 may include identifier data that may be used to retrieve one or more records from a database or other suitable data structure stored in a non-transitory computer-readable medium accessible to the electronic signature service 102. The identifier data may be used by the electronic signature service 102 to retrieve the metadata 108 from the non-transitory computer-readable medium. The metadata 108 can be used to identify one or more signatories for the document 104.

The method for implementing block 304 also involves accessing organization data 112, as depicted in block 404. For example, a suitable processing device of the electronic signature service 102 can execute program code to perform one or more suitable algorithms for accessing the organization data 112 from a suitable non-transitory computer-readable medium.

The method for implementing block 304 also involves determining whether a client account associated with the identified signatory is present in the electronic signature service 102, as depicted in block 406. For example, a suitable processing device of the electronic signature service 102 can execute program code to perform one or more suitable algorithms for determining whether a client account associated with the identified signatory is present in the electronic signature service 102. Determining whether a client account associated with the identified signatory is present in the electronic signature service 102 can involve comparing identification data for the signatory obtained at block 402 with one or more records in a data source that identify client accounts for the electronic signature service 102. Determining whether the client account exists for the identified signatory can allow the electronic signature service 102 to determine if further evaluation of one or more rules 114*a-n* is required prior to providing access to the electronic document 104 by the signatory 110. For example, if the identified signatory is not subscribed to the electronic signature service 102, the organization data 112 may not include any data with respect to the identified signatory.

If a client account associated with the identified signatory is not present in the electronic signature service 102, the method for implementing block 304 involves providing access to the electronic document 104 by a computing device associated with the identified signatory, as depicted in block 408. For example, a suitable processing device of the electronic signature service 102 can execute program code to perform one or more suitable algorithms for providing access to the electronic document 104 by a computing device associated with the identified signatory. Providing access to the electronic document 104 can include, for example, transmitting a link to the electronic document 104 or a copy of the electronic document 104 to the computing device via suitable data network.

If a client account associated with the identified signatory is present in the electronic signature service 102, the method for implementing block 304 involves determining whether the client account is associated with the organization 116, as depicted in block 410. For example, a suitable processing device of the electronic signature service 102 can execute program code to perform one or more suitable algorithms for determining whether the client account is associated with the organization 116. Such algorithms can involve accessing one or more records for the client account that identify one or more associations between the client account and one or more organizations 116. The electronic signature service 102 can identify associations between the client account and one or more organizations 116 from data in the accessed records. If the client account is not associated with the organization, the method for implementing block 304 can proceed to block 408.

If the client account is associated with the organization, the method for implementing block 304 involves determining whether the client account is associated with sufficient signature authority to execute the electronic document 104, as depicted in block 412. For example, a suitable processing device of the electronic signature service 102 can execute program code to perform one or more suitable algorithms for determining whether the client account is associated with sufficient signature authority to execute the electronic document 104. If the client account is associated with sufficient signature authority to execute the electronic document 104, the method for implementing block 304 can proceed to block 408.

In some embodiments, determining whether the client account is associated with sufficient signature authority to execute the electronic document 104 can involve determining whether one or more rules 114*a-n* specifically identify the client account as lacking authority to execute the electronic document 104 or type of electronic document 104. For example, one or more rules 114*a-n* may indicate that a given client account is associated with a signatory 110 that has left the organization 116, has changed roles within the organization 116, has changed departments within the organization 116, or has otherwise altered his or her relationship with the organization 116 such that the signatory 110 that was previously authorized to execute certain documents 104 is no longer authorized to execute those electronic documents 104.

In additional or alternative embodiments, determining whether the client account is associated with sufficient signature authority to execute the electronic document 104 can involve determining whether one or more rules 114*a-n* specifically identify the client account as having authority to execute the electronic document 104 or type of electronic document 104. If one or more rules 114*a-n* does not specifically identify the client account as having authority to execute the electronic document 104 or type of electronic document 104, the electronic signature service 102 can proceed to block 414. In some embodiments, determining whether the client account is associated with sufficient signature authority to execute the electronic document 104 can involve determining whether the client account is included in a group of accounts that is identified in the organization data 112 as being authorized to execute the electronic document 104 or type of electronic document 104. In additional or alternative embodiments, determining whether the client account is associated with sufficient signature authority to execute the electronic document 104 can involve determining whether the client account is associated with a role in the organization 116 that is identified in the organization data 112 as being authorized to execute the electronic document 104 or type of electronic document 104. In additional or alternative embodiments, determining whether the client account is associated with sufficient signature authority to execute the electronic document 104 can involve determining whether the client account is associated with a department in the organization 116 that is identified in the organization data 112 as being authorized to execute the electronic document 104 or type of electronic document 104.

In some embodiments, the rules 114*a-n* may not specifically identify the client account as having authority to execute the electronic document 104 or as lacking the authority to execute the electronic document 104. In some embodiments, the electronic signature service 102 can respond to the absence of such a rule by proceeding to one of blocks 408, 414. In other embodiments, the electronic signature service 102 can respond to the absence of such a rule by configuring a suitable processing device to generate electronic communications that notify one or more entities in the organization 116 of the absence of such a rule. For example, the electronic signature service 102 can notify an auditing group or other appropriate entity within the organization 116 that a signatory to an electronic document 104 is included in the organization, but that the organization data 112 does not specify any presence or absence of signature authority for the signatory. The electronic signature service 102 can subsequently receive, from a computing device associated with the entity, updated organization data 112 or data that can be used to update the organization data 112 (e.g., a rule specific to the signatory or the client account for the signatory). The electronic signature service 102 can execute the block 412 using the updated organization data 112 to determine whether the client account associated with the signatory has sufficient signature authority.

If the client account is not associated with sufficient signature authority to execute the electronic document 104, the method for implementing block 304 involves preventing the signatory from executing the electronic document 104, as depicted in block 414. For example, a suitable processing device of the electronic signature service 102 can execute program code to perform one or more suitable algorithms for preventing the signatory 110 from executing the electronic document 104.

In some embodiments, preventing the signatory 110 from executing the electronic document 104 can involve automatically modifying the electronic document 104 and/or metadata 108 associated with the electronic document 104 such that the electronic document 104 is no longer associated with the signatory 110. For example, as described above with respect to FIG. 2, the electronic signature service 102 can automatically modify a signature block 105 that is associated with the signatory 110 such that the signature block 105 is removed or is changed to a signature block 204 that is associated via the metadata 108 with an authorized signatory 202.

In additional or alternative embodiments, preventing the signatory 110 from executing the electronic document 104 can involve disabling access to the electronic signature service 102 by the signatory 110. For example, the electronic signature service 102 can disable access by the signatory 110 by updating a client account associated with the signatory 110 to indicate that the client account cannot be used to execute the electronic document 104 or type of electronic document 104.

In additional or alternative embodiments, preventing the signatory 110 from executing the electronic document 104 can involve discarding, rejecting, or otherwise disregarding one or more inputs received by the electronic signature service 102 from the signatory 110 with respect to the electronic document 104 for which the signatory 110 lacks signature authority. For example, the signatory 110 may be a sender 106 of the electronic document 104 who is attempting (either intentionally or inadvertently) to exceed his or her signature authority with respect to the document. The electronic signature service 102 may receive the electronic document 104 from a computing device associated with the signatory 110. The electronic signature service 102 may determine that the signatory 110 is not authorized to execute the electronic document 104 after receiving the electronic document 104 from a computing device associated with the signatory 110. The electronic signature service 102 may respond to this determination by discarding, rejecting, or otherwise disregarding one or more commands, requests, or other input received via a data network indicating an intent to transmit the electronic document 104 with the signature block 105 to one or more other signatories. Discarding, rejecting, or otherwise disregarding such commands, requests, or other input can prevent the signatory 110 from using the electronic signature service 102 to transmit an electronic document 104 that is signed or otherwise executed by the signatory 110 without the signatory 110 having sufficient signature authority to do so.

The method depicted in FIG. 4 can be executed at any suitable point in time. In some embodiments, the organization data 112 can be received by the electronic signature service 102 prior to any electronic documents 104 being received by the electronic signature service 102. In such embodiments, the method depicted in FIG. 4 can be performed after electronic documents 104 are created using or received by the electronic signature service 102. The electronic documents 104 can be created by individuals within the organization 116 using the electronic signature service 102, provided to the electronic signature service 102 by computing devices associated with individuals within the organization 116, and/or provided to the electronic signature service 102 by computing devices associated with individuals that are not associated with the organization 116.

In other embodiments, the organization data 112 can be received by the electronic signature service 102 after electronic documents 104 being received by the electronic signature service 102. In such embodiments, the method depicted in FIG. 4 can be performed on one or more existing electronic documents 104 accessible to the electronic signature service 102. The method depicted in FIG. 4 may be performed on one or more existing electronic documents 104 in response to the organization data 112 being received, generated, or modified by the electronic signature service 102. Doing so can ensure that some or all of the electronic documents 104 accessible to the electronic signature service 102 include signature blocks associated with authorized signatories. Additionally or alternatively, the method depicted in FIG. 4 may be performed for one or more existing electronic documents 104 in response to one or more individuals in the organization data 112 attempting to use the electronic signature service 102 to transmit one or more of the existing documents to other recipients. Doing so can ensure that the most recent organization data 112 is used to verify that one or more electronic documents 104 being provided for execution include signature blocks associated with authorized signatories as specified in or otherwise identified from the organization data 112.

Any suitable method or set of methods can be used to replace an unauthorized signatory 110 with an authorized signatory 202 in an electronic document 104. Examples of such methods are depicted in FIGS. 5-8.

Figure 5:
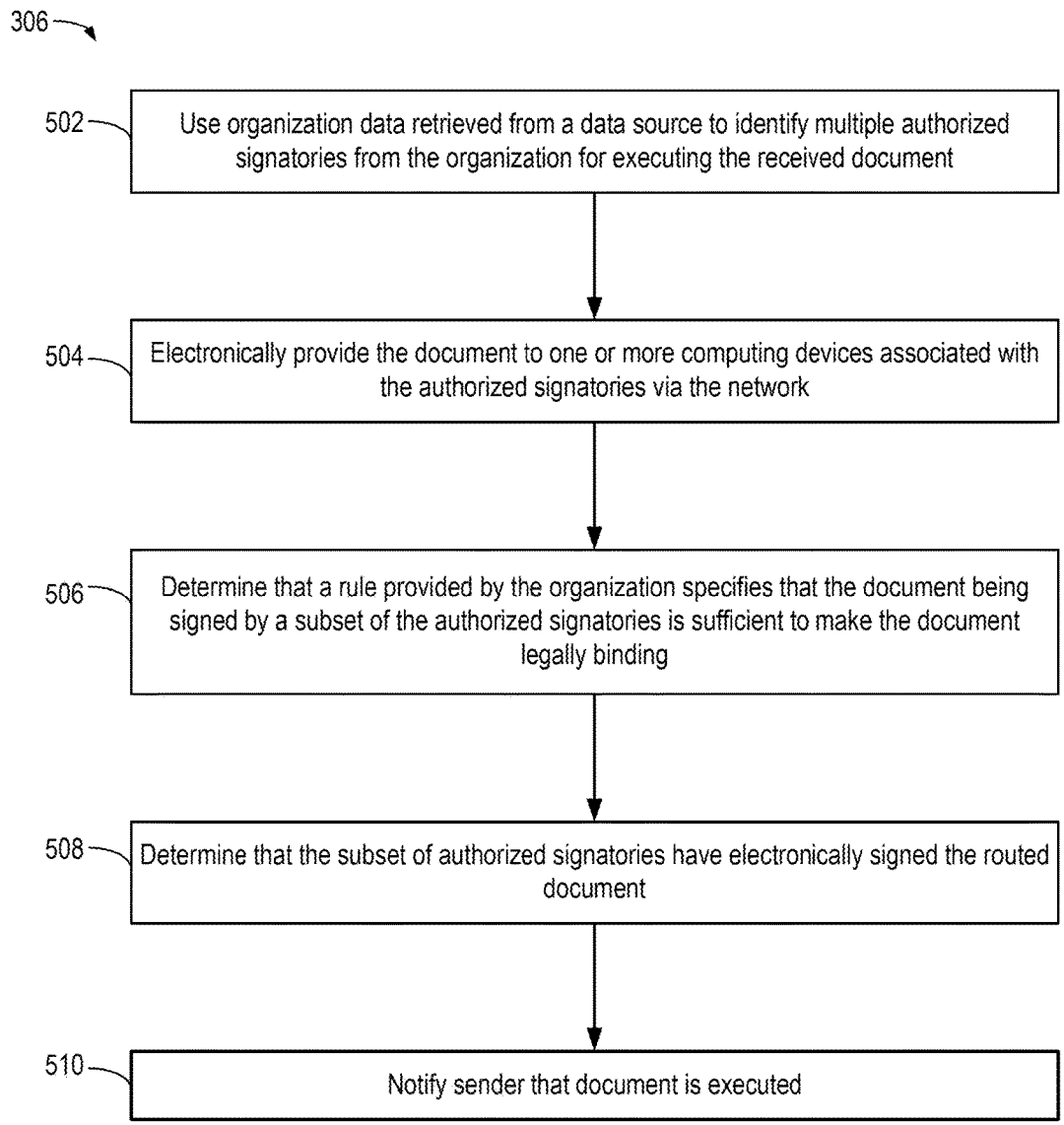
FIG. 5 is a flow chart illustrating an example of a method for automatically identifying subsets of authorized signatories from an organization for executing an electronic document according to certain exemplary embodiments.

FIG. 5 is a flow chart illustrating an example of a method for automatically identifying subsets of authorized signatories from an organization 116 for executing an electronic document 104. For illustrative purposes, the method depicted in FIG. 5 is described as an example for implementing block 306 with reference to the exemplary implementation depicted in FIGS. 1-3. Other implementations, however, are possible.

The method for implementing block 306 involves using organization data 112 retrieved from a data source to identify authorized signatories from the organization 116 for executing the received electronic document 104, as depicted in block 502. For example, the electronic signature service 102 can automatically identify or otherwise determine a plurality of authorized signatories, as described above with respect to FIG. 2 and in a similar manner as that described above with respect to block 306 in FIG. 3.

The method for implementing block 306 also involves electronically providing the electronic document 104 to authorized signatories, as depicted in block 504. Any suitable electronic communication 208 can be used to provide the electronic document 104 to authorized signatory 202, as described above with respect to FIG. 1. For example, the electronic signature service 102 can transmit a copy of the electronic document 104 to the signatory 202 via a suitable data network and/or transmit a notification to the signatory 202 via a suitable data network that the electronic document 104 can be accessed via a specified website.

The method for implementing block 306 also involves determining that a rule provided by the organization 116 specifies that the electronic document 104 being signed by a subset of the authorized signatories is sufficient to make the document legally binding, as depicted in block 506. For example, a processing device executing the electronic signature service 102 can reference one or more of the rules 114a-n included in the organization data 112. The referenced rule provided by the organization 116 can specify that the document is legally binding if certain specified officers of the organization have signed the electronic document 104, if a specified number of board members have signed the electronic document 104, if one or more signatories having an appropriate role in the organization 116 have signed the electronic document 104, etc., consistent with the applicable organizational structure specified in the organization data 112 and rules 114a-n.

In some embodiments, the electronic signature service 102 may execute one or more processes that account for both sets of signatory 202 returning signed copies of the electronic document 104. In one example, the electronic signature service 102 may notify a first set of signatories 202 that no further signatures are required after determining that all of a second set of signatories 202 have signed the electronic document 104. In another example, the electronic signature service 102 may bar a first set of signatories 202 from accessing the electronic document 104 via a website after determining that all of a second set of signatories 202 have signed the electronic document 104. In another example, the electronic signature service 102 may simply discard any signatures received from a first set of signatories 202 after determining that all of a second set of signatories 202 have signed the electronic document 104.

The method for implementing block 306 also involves determining that the subset of authorized signatories has signed the routed document such that the document appears to be fully executed by and legally binding upon the organization, as depicted in block 508. For example, a processing device executing the electronic signature service 102 can reference one or more of the rules 114a-n each time an electronic communications indicating execution of the document by one of the signatories 202 is received by the electronic signature service 102. The electronic signature service 102 can determine whether the received signatures satisfy one or more referenced rules. For example, the electronic signature service 102 can determine that certain specified officers of the organization have signed the electronic document 104, that a specified number of board members have signed the electronic document 104, that one or more signatories having an appropriate role in the organization 116 have signed the electronic document 104, etc. Examples of processes for determining which signatories have signed a document include monitoring a master copy of the electronic document 104 on a server to determine if the document has been modified, updating a database each time a signed copy of the document is received from a signatory, etc.

In some embodiments, if the received signatures satisfy the referenced rule(s), the method for implementing block 306 also involves notifying the sender that the electronic document 104 is executed, as depicted in block 510. The electronic signature service 102 can notify the sender 106 that the electronic document 104 has been executed via one or more suitable electronic communications. In some embodiments, notifying the sender 106 that electronic document 104 is executed can involve notifying the sender 106 that a sufficient number of signatures have been received. In additional or alternative embodiments, notifying the sender 106 that electronic document 104 is executed can involve notifying the sender 106 that the electronic document 104 appears to be legally binding or that some other legal effect appears to have been achieved as a result of a sufficient number of signatures from authorized person(s) having been received.

Figure 6:
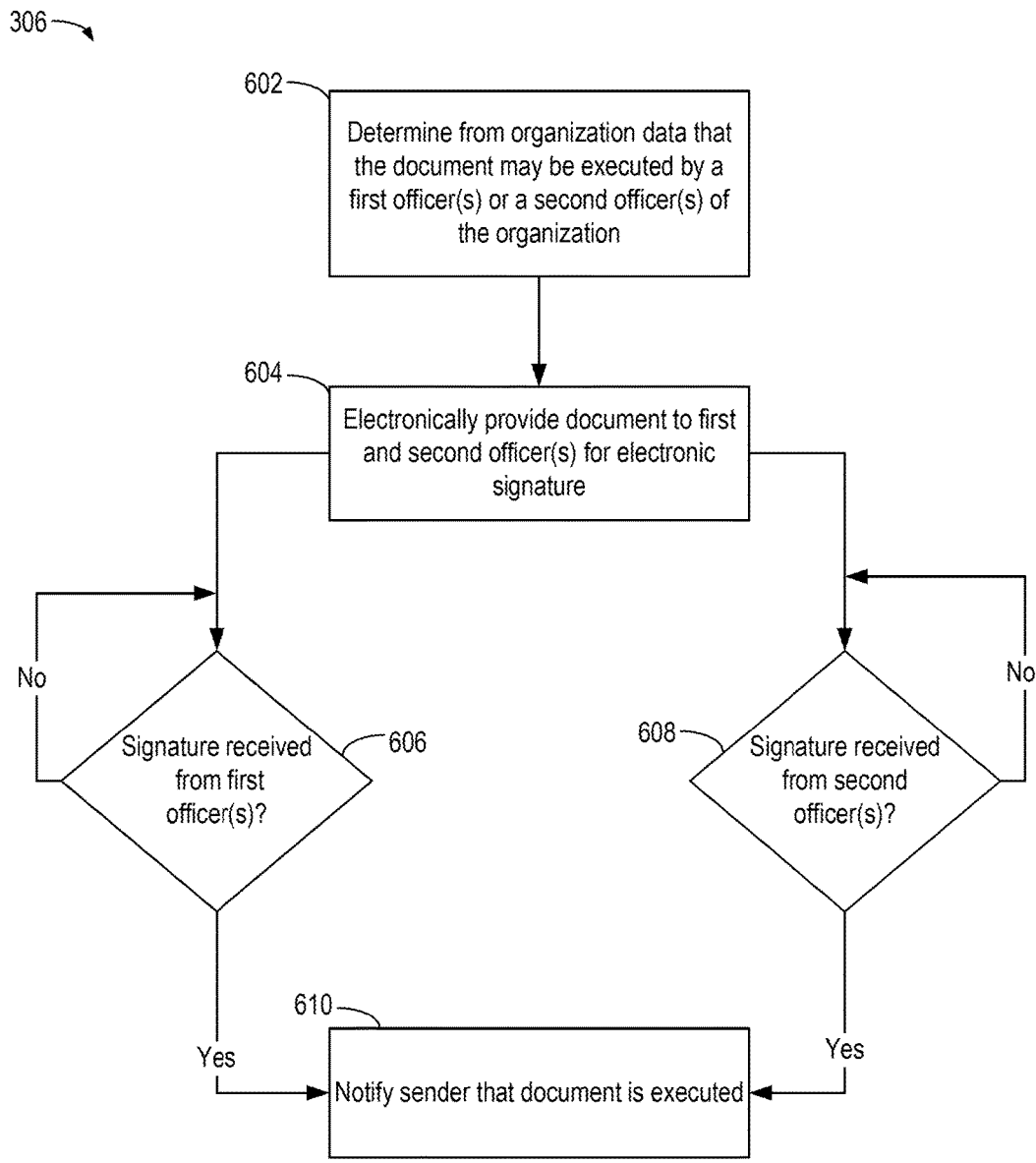
FIG. 6 is a flow chart illustrating an example of a method for automatically identifying different officers of an organization as authorized signatories for executing an electronic document according to certain exemplary embodiments.

In additional or alternative embodiments, the electronic signature service 102 can identify officers or groups of officers of an organization as authorized signatories. For example, FIG. 6 is a flow chart illustrating an example of a method for automatically identifying different officers of an organization 116 as authorized signatories for executing an electronic document 104. For illustrative purposes, the method for implementing block 306 is described with reference to the implementation depicted in FIGS. 1-3. Other implementations, however, are possible.

The method for implementing block 306 involves determining from organization data 112 that the document may be executed by a first officer (or group of officers) or a second officer (or group of officers) of the organization 116, as depicted in block 602. For example, the electronic signature service 102 can determine from the organizational structure specified in the organization data 112 that the organization 116 includes multiple officers (e.g., a president, a secretary, and a chairperson of the board). The electronic signature service 102 can also determine from one or more of the rules 114a-n that the electronic document 104 is legally binding if signed by either the first officer (or group of officers) or the second officer (or group of officers). For example, a first one of the rules 114a-n can specify that the electronic document 104 is legally binding if signed by both the president and the secretary (i.e., the first officer or group of officers). A second one of the rules 114a-n can specify that the electronic document 104 is legally binding if signed by the chairperson of the board (i.e., the second officer or group of officers).

In some embodiments, the electronic signature service 102 may automatically identify a signatory 202 that has authority similar to a prior signature authority associated with the signatory 110. For example, the sender 106 may request that the electronic signature service 102 send a contract to "Joe Snuffy" for signature or the electronic signature service 102 may determine that the electronic document 104 lists "Joe Snuffy" as the signatory. However, the sender 106 may be unaware that Joe Snuffy is no longer affiliated with the organization 116 or has been demoted from a managerial position in the organization 116. The electronic signature service 102 can assist the sender 106 with finding an appropriate signatory for the electronic document 104, such as an individual who has assumed Joe Snuffy's previous responsibilities. For example, a rule 114a may indicate that a signatory 110 who no longer has signature authority for the electronic document 104 was previously an officer of the organization. The electronic signature service 102 may select the signatory 202 based on the signatory 202 being identified in the organization data 112 as holding the same position previously held by the signatory 110.

The method for implementing block 306 also involves electronically providing the electronic document 104 to both the first and second officers (or groups of officers) for electronic signature, as depicted in block 604. Electronically providing the electronic document 104 to both the first and second officers (or groups of officers) for electronic signature can include one or more of the operations described above with respect to block 308 in FIG. 3, as well as one or more additional operations performed by a processing device executing the electronic signature service 102. For example, the electronic signature service 102 can reference the organization data 100 to identify the e-mail addresses or other electronic contact information for each of the first and second officers. The electronic signature service 102 can notify the first and second officers that the electronic document 104 is available for signature by transmitting electronic communications 208 to electronic addresses specified in the electronic contact information for the respective first and second officers. Any suitable electronic communication 208 can be used to notify the respective first and second officers of the availability of the electronic document 104 for signature.

The method for implementing block 306 also involves determining whether the required signature(s) from the first officer(s) have been received, as depicted in block 606. For example, the electronic signature service 102 can receive signature(s) via suitable electronic communication(s) from the first officer or group of officers (e.g., signatures from the president and the secretary). If the required signature(s) from the first officer(s) have been received, the method for implementing block 306 involves notifying the sender 106 that the electronic document 104 is executed, as depicted in block 610. If the required signature(s) from the first officer(s) have not been received, the electronic signature service 102 continues waiting for the remaining signature(s) from the first officer(s), as depicted by the method for implementing block 306 returning to block 606.

The method for implementing block 306 also involves determining whether the required signatures from the second officer or group of officers has been received, as depicted in block 608. For example, the electronic signature service 102 can receive signature(s) via suitable electronic communication(s) from the second officer or group of officers (e.g., signature from the chairperson of the board). If the required signature(s) from the second officer(s) have been received, the method for implementing block 306 involves notifying the sender 106 that the electronic document 104 is executed, as depicted in block 610. If the required signature(s) from the second officer(s) have not been received, the electronic signature service 102 continues waiting for the remaining signature(s) from the second officer(s), as depicted by the method for implementing block 306 returning to block 608.

In some embodiments, the electronic signature service 102 may execute one or more processes that account for both the first and second officer returning signed copies of the electronic document 104. In one example, the electronic signature service 102 may notify the first officer that no further signatures are required after determining that the second officer has signed the electronic document 104. In another example, the electronic signature service 102 may bar the first officer from accessing the electronic document 104 via a website after determining that the second officer has signed the electronic document 104. In another example, the electronic signature service 102 may simply discard a signature received from the first officer after determining that the second officer has signed the electronic document 104.

Figure 7:
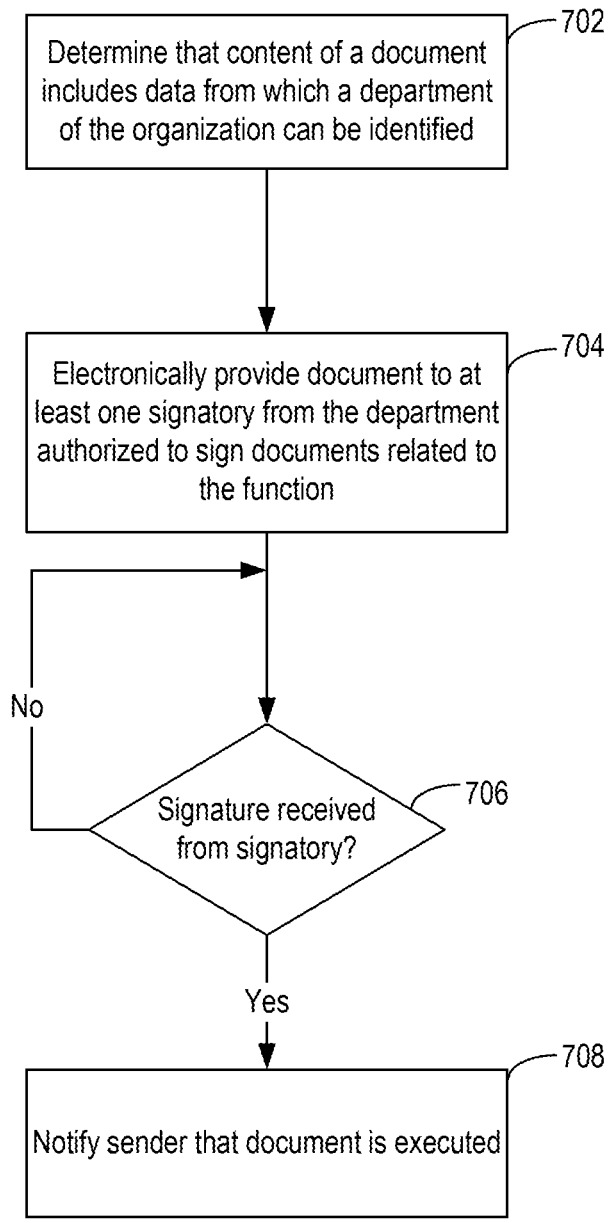
FIG. 7 is a flow chart illustrating an example of a method for automatically identifying signatories for executing an electronic document based on identifying a department of an organization that has a function related to the document according to certain exemplary embodiments.

FIG. 7 is a flow chart illustrating an example of a method for automatically identifying signatories for executing an electronic document 104 based on identifying a department of the organization 116 that has a function related to the electronic document 104. For illustrative purposes, the method for implementing block 306 is described with reference to the implementation depicted in FIGS. 1-3. Other implementations, however, are possible.

The method for implementing block 306 involves determining that content of the electronic document 104 includes data from which a department of the organization 116 can be identified, as depicted in block 702.

In some embodiments, the electronic signature service 102 may automatically identify a department having sufficient signature authority based on the signatory 110 being previously assigned to the department. For example, content in the electronic document 104 may identify the signatory 110. The electronic signature service 102 can determine from a rule 114a that the signatory 110 who no longer has signature authority for the electronic document 104 was previously assigned to a given department. The electronic signature service 102 may select the signatory 202 based on the signatory 202 being assigned to the same department to which the signatory 110 was previously assigned.

In additional or alternative embodiments, the electronic signature service 102 can analyze the text of electronic document 104 to identify one or more words or phrases in the document that may be used to identify functions associated with a given department. The electronic signature service 102 can compare the identified words or phrases from the document with one or more organization functions described in the organization data 112. In one example, the electronic signature service 102 may determine that the one or more words or phrases in the document refer to logistical functions (e.g., "load plans," "shipping routes," etc.) performed by a logistics department in the organization 116 as specified in the organization data 112. In another example, the electronic signature service 102 may determine that the one or more words or phrases in the document refer to financial functions (e.g., "account record," "purchase order," etc.) performed by a financial department in the organization 116 as specified in the organization data 112.

The method for implementing block 306 also involves electronically providing the electronic document 104 to at least one signatory from the department that is authorized to sign documents related to the function, as depicted in block 704. For example, the electronic signature service 102 can reference the organization data 112 to automatically identify one or more individuals from the department that are authorized to execute documents related to the identified department function (e.g., a vice president or manager in charge of a given department). The electronic signature service 102 can provide the electronic document 104 to each identified signatory by transmitting a suitable electronic communication to the signatory (e.g., electronic mail, text message, etc.).

Any suitable process can be used for identifying appropriate signatories based on organization departments that identified by analyzing the content of the received electronic document 104. In some embodiments, the electronic signature service 102 may select the lowest echelon in a hierarchical organization to identify an appropriate signatory for the document. For example, an organization may include a chain of retail stores having stores in different states of a region of a country. One or more of the rules 114a-n may specify that a regional manager for the chain of stores is authorized to execute purchase orders for any store in any state and that each state-level manager for a respective state is authorized to execute purchase orders for any store in the respective state. The electronic signature service 102 may identify a state-level manager as a signatory rather than a regional-level manager based on the electronic document 104 including references to a single state in the region rather than multiple states in the region.

In additional or alternative embodiments, the electronic signature service 102 may determine that the electronic document 104 includes references to multiple departments in the organization and identify one or more signatories having authority over both departments. For example, the content of the document may include references to purchases by two different stores in two different states in a regional or national chain of stores. One of the rules 114a-n may specify that purchase orders that affect stores in multiple regions must be signed by a regional manager. The electronic signature service 102 may reference the organizational structure specified in the organization data 112 to identify a regional manager for the region including both states references in the electronic document 104. The electronic signature service 102 may electronically provide the electronic document 104 to the regional manager or otherwise notify the regional manager that the electronic document 104 is available for signature.

In additional or alternative embodiments, the electronic signature service 102 may identify an appropriate signatory based on content in the electronic document 104 indicating that a given threshold condition has been satisfied. For example, one or more of the rules 114a-n may specify that contracts involving dollar amounts below a specified threshold may be executed by a lower-echelon department and that contracts involving dollar amounts above the specified threshold must be executed by a higher-echelon department. The electronic signature service 102 can determine from the content of the electronic document 104 that the electronic document 104 is a contract involving amounts above or below the specified threshold and can select a signatory from the appropriate echelon based on the rules 114a-n.

The method for implementing block 306 also involves determining if electronic signatures have been received from the identified signatories, as depicted in block 706. If the electronic signatures have been received from the identified signatories, the method for implementing block 306 involves notifying the sender 106 that the electronic document 104 is executed, as depicted in block 708. If electronic signatures have not been received from the identified signatories, the electronic signature service 102 returns to block 706 and continues waiting for the required signatures. In some embodiments, the electronic signature service 102 may be configured to notify the sender 106 and/or send follow-up notifications to the identified signatories if the electronic signatures have been received from the identified signatories within a specified amount of time. In additional or alternative embodiments, the electronic signature service 102 may reference a rule designating alternative signatories if an initially identified signatory has not signed the electronic document 104 within a specified amount of time.

Figure 8:
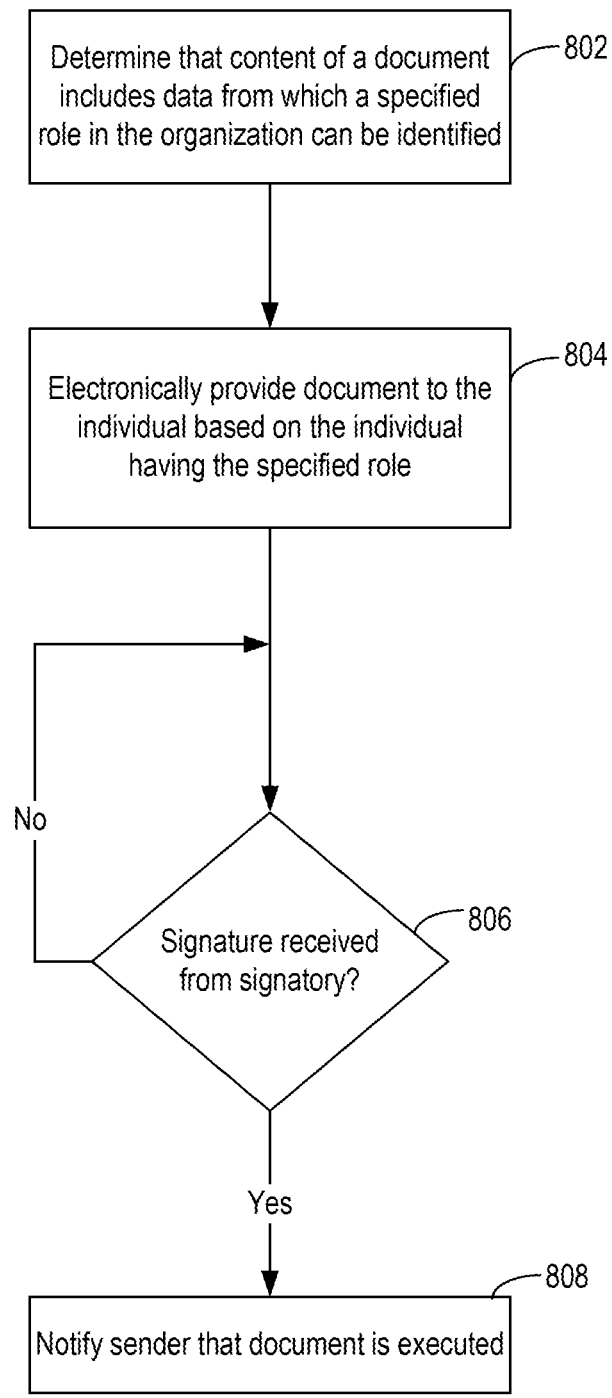
FIG. 8 is a flow chart illustrating an example of a method for automatically identifying signatories for executing an electronic document based on identifying a role of an individual in an organization who has a function related to the document according to certain exemplary embodiments.

FIG. 8 is a flow chart illustrating an example of a method for implementing block 306 for automatically identifying signatories for executing an electronic document 104 based on identifying a role of an individual in the organization 116 that has a function related to the electronic document 104. For illustrative purposes, the method for implementing block 306 is described with reference to the implementation depicted in FIGS. 1-3. Other implementations, however, are possible.

The method for implementing block 306 involves determining that content of an electronic document 104 includes data from which a specified role in the organization 116 can be identified, as depicted in block 802.

In some embodiments, the electronic signature service 102 may automatically identify a role having sufficient signature authority based on the signatory 110 previously holding the role. For example, content in the electronic document 104 may identify the signatory 110. The electronic signature service 102 can determine from a rule 114a that the signatory 110 who no longer has signature authority for the electronic document 104 previously held a given role in the organization 116. The electronic signature service 102 may select the signatory 202 based on the signatory 202 having the role that was previously held by the signatory 110.

In additional or alternative embodiments, the electronic signature service 102 can analyze the text of electronic document 104 to identify one or more words or phrases in the document that may be used to identify functions associated with a given role in the organization. The electronic signature service 102 can compare the identified words or phrases from the document with one or more functions specific to certain roles in the organization, as described in the organization structure specified in the organization data 112 or other organization data 112. The electronic signature service 102 can identify one or more roles in the organization 116 based on the comparison and use the identified role or roles to determine how to replace data referring to an unauthorized signatory 110 with one or more authorized signatories 202.

For example, the electronic signature service 102 may receive an electronic document 104 to be routed to an organization 116 such as a law firm handling patent matters. The electronic signature service 102 may determine that a signatory 110 associated with the received document 104 has lost or otherwise lacks the authority to execute the received document 104, as described above. The electronic signature service 102 may respond to this determination by using one or more words or phrases in the document to identify at least one replacement signatory 202 having sufficient authority to execute the document 104. For example, the electronic signature service 102 may determine that one or more words or phrases in the document 104 refer to functions related to the filing and prosecution of patent applications (e.g., signing official communications). The electronic signature service 102 may determine from one or more of the rules 114a-n that any individuals currently identified as having the role "patent attorney" may perform the functions referenced by the identified words or phrases. Alternatively, the electronic signature service 102 may determine that one or more words or phrases in the document refer to functions related to entering into agreements with new clients. The electronic signature service 102 may determine from one or more of the rules 114a-n that any individuals currently having the role "partner" may perform the functions referenced by the identified words or phrases.

The method for implementing block 306 also involves electronically providing the electronic document 104 to at least one signatory from the role that is authorized to sign documents related to the function, as depicted in block 804. For example, the electronic signature service 102 can reference the organization data 112 to automatically identify one or more individuals having the specified role that are authorized to execute documents related to the identified function (e.g., a "patent attorney" at a law firm or a "partner" at the law firm). The electronic signature service 102 can provide the electronic document 104 to each identified signatory by transmitting a suitable electronic communication to the signatory (e.g., electronic mail, text message, etc.).

The method for implementing block 306 also involves determining if electronic signatures have been received from the identified signatories, as depicted in block 806. If the electronic signatures have been received from the identified signatories, the method for implementing block 306 also involves notifying the sender 106 that the electronic document 104 is executed, as depicted in block 808. If electronic signatures have not been received from the identified signatories, the electronic signature service 102 continues waiting for the required signatures, as depicted by the method for implementing block 306 returning to block 806.

Although FIGS. 5-8 describe embodiments in which a sender 106 of the electronic document 104 is notified that the electronic document 104 is executed, other implementations are possible. For example, a sender 106 may be an individual or entity that belongs to the organization 116 and that is responsible for managing contracts or other legal documents for the organization 116. In some cases, the individual or entity responsible for management of legal documents may utilize the electronic signature service 102 to determine an appropriate level of signature authority for an electronic document 104. However, in other cases, the individual or entity responsible for management of legal documents may incorrectly identify an unauthorized signatory 110 that lacks signature authority for an electronic document 104 (e.g., by manually identifying or otherwise selecting an unauthorized signatory 110). For example, the sender 106 may be unaware of which individuals in the organization 116 are authorized to sign the document. The sender 106 may cause data identifying an unauthorized signatory 110 to be included in the metadata 108. The electronic signature service 102 can correct this error by determining an appropriate level of signature authority for the electronic document 104 based on the subject matter of the electronic document 104. For example, the sender 106 may specify the subject matter of the electronic document 104, the electronic signature service 102 may determine the subject matter of the electronic document 104 by analyzing the content of the electronic document 104, and/or the electronic signature service 102 may determine potential types of subject matter of the electronic document 104 and present suggested types of subject matter to the sender 106 via a graphical interface for selection by the sender 106. The electronic signature service 102 can select one or more individuals having the appropriate signature authority using one or more of the processes described above with respect to FIGS. 5-8. The electronic signature service 102 can modify the metadata 108 to identify one or more authorized signatories 202 based on determining the signature authority for the electronic document 104. The electronic signature service 102 can route the electronic document 104 to the authorized signatory or signatories for signature without further involvement from or notification of the sender 106.

Any suitable server or other computing system can be used to implement the electronic signature service 102. For example, FIG. 9 is a block diagram depicting an example of a server system 900 for implementing certain embodiments.

The server system 900 can include a processor 902 that is communicatively coupled to a memory 904 and that executes computer-executable program instructions and/or accesses information stored in the memory 904. The processor 902 may comprise a microprocessor, an application-specific integrated circuit ("ASIC"), a state machine, or other processing device. The processor 902 can include any of a number of processing devices, including one. Such a processor can include or may be in communication with a computer-readable medium storing instructions that, when executed by the processor 902, cause the processor to perform the operations described herein.

The memory 904 can include any suitable computer-readable medium. The computer-readable medium can include any electronic, optical, magnetic, or other storage device capable of providing a processor with computer-readable instructions or other program code. Examples of a computer-readable medium include a floppy disk, CD-ROM, DVD, magnetic disk, memory chip, ROM, RAM, an ASIC, a configured processor, optical storage, magnetic tape or other magnetic storage, or any other medium from which a computer processor can read instructions. The instructions may include processor-specific instructions generated by a compiler and/or an interpreter from code written in any suitable computer-programming language, including, for example, C, C++, C#, Visual Basic, Java, Python, Perl, JavaScript, and ActionScript.

The server system 900 may also comprise a number of external or internal devices such as input or output devices. For example, the server system 900 is shown with an input/output ("I/O") interface 908 that can receive input from input devices or provide output to output devices. A bus 906 can also be included in the server system 900. The bus 906 can communicatively couple one or more components of the server system 900.

The server system 900 can execute program code for the electronic signature service 102. The program code for the electronic signature service 102 may be resident in any suitable computer-readable medium and execute on any suitable processor. In one embodiment, the program code for the electronic signature service 102 can reside in the memory 904 at the server system 900. In another embodiment, the program code for the electronic signature service 102 can be accessed by the server system 900 from a remote content provider via a data network. The electronic signature service 102 stored in the memory 904 can configure the processor 902 to perform the operations described in FIGS. 1-8.

The server system 900 can also include at least one network interface 910. The network interface 910 can include any device or group of devices suitable for establishing a wired or wireless data connection to a data network 912. Examples of the network interface 910 include an Ethernet network adapter, a modem, and/or the like.

The server system 900 can communicate with a computing system 914 via the data network 912. A computing system 914 can include any suitable computing device for executing a client application 916 configured for accessing the electronic signature service 102 via the network 912. Examples of a computing system 914 include a desktop computer, a tablet computer, a laptop computer, or any other computing device. Examples of a client application 916 include a web browser application, an e-mail application, a dedicated application for accessing the electronic signature service 102, etc.

GENERAL CONSIDERATIONS

Numerous specific details are set forth herein to provide a thorough understanding of the claimed subject matter. However, those skilled in the art will understand that the claimed subject matter may be practiced without these specific details. In other instances, methods, apparatuses, or systems that would be known by one of ordinary skill have not been described in detail so as not to obscure claimed subject matter.

Unless specifically stated otherwise, it is appreciated that throughout this specification discussions utilizing terms such as "processing," "computing," "calculating," "determining," and "identifying" or the like refer to actions or processes of a computing device, such as one or more computers or a similar electronic computing device or devices, that manipulate or transform data represented as physical electronic or magnetic quantities within memories, registers, or other information storage devices, transmission devices, or display devices of the computing platform.

The system or systems discussed herein are not limited to any particular hardware architecture or configuration. A computing device can include any suitable arrangement of components that provides a result conditioned on one or more inputs. Suitable computing devices include multipurpose microprocessor-based computer systems accessing stored software that programs or configures the computing system from a general purpose computing apparatus to a specialized computing apparatus implementing one or more embodiments of the present subject matter. Any suitable programming, scripting, or other type of language or combinations of languages may be used to implement the teachings contained herein in software to be used in programming or configuring a computing device.

Embodiments of the methods disclosed herein may be performed in the operation of such computing devices. The order of the blocks presented in the examples above can be varied—for example, blocks can be re-ordered, combined, and/or broken into sub-blocks. Certain blocks or processes can be performed in parallel.

The use of "adapted to" or "configured to" herein is meant as open and inclusive language that does not foreclose devices adapted to or configured to perform additional tasks or steps. Additionally, the use of "based on" is meant to be open and inclusive, in that a process, step, calculation, or other action "based on" one or more recited conditions or values may, in practice, be based on additional conditions or values beyond those recited. Headings, lists, and numbering included herein are for ease of explanation only and are not meant to be limiting.

While the present subject matter has been described in detail with respect to specific embodiments thereof, it will be appreciated that those skilled in the art, upon attaining an understanding of the foregoing, may readily produce alterations to, variations of, and equivalents to such embodiments. Accordingly, it should be understood that the present disclosure has been presented for purposes of example rather than limitation, and does not preclude inclusion of such modifications, variations, and/or additions to the present subject matter as would be readily apparent to one of ordinary skill in the art.

The invention claimed is:

1. A method for automatically updating an electronic document to prevent execution by an unauthorized signatory, the method comprising:
    receiving, by an electronic signature service computing system and from a first client device associated with a sender, an electronic document to be electronically signed on behalf of an organization, wherein the electronic signature service is executed by a processing device;
    retrieving, by the electronic signature service computing system from a data structure used by the electronic signature service computing system and stored on a non-transitory computer-readable medium, organization data specifying an access right for the electronic document by indicating signatories that are authorized to electronically sign the electronic document, wherein the organization data is inaccessible to a first signatory identifiable from metadata of the electronic document;
    determining, by the electronic signature service computing system, that the first signatory associated with the electronic document is not authorized to electronically sign the document, wherein an absence of signature authority for the first signatory is determined from the retrieved organization data by performing operations comprising:
        identifying, from the organizational data, an organizational structure identifying roles for the organization,
        identifying, in the organizational data, authorization data specifying a subset of the organizational structure to which an authority to execute the electronic document is limited, and determining that the organizational data lacks a mapping between the subset of the organizational structure and a user account associated with the first signatory and used for accessing the electronic signature service computing system; and preventing the first signatory from using a second client device for electronically signing the electronic document based on determining that the first signatory is not authorized to electronically sign the document, wherein preventing the first signatory from electronically signing the electronic document comprises transforming the metadata of the electronic document by removing, from the metadata, an identifier of the first signatory and adding, to the metadata, an identifier of a second signatory.

2. The method of claim 1, wherein preventing the first signatory from electronically signing the electronic document further comprises disabling or restricting the user account that is associated with the first signatory and that is used for accessing the electronic signature service.

3. The method of claim 1, wherein preventing the first signatory from electronically signing the electronic document further comprises rejecting a request to provide access to the electronic document for signature by the first signatory, wherein the request is received from an additional computing device associated with the first signatory.

4. The method of claim 1, further comprising determining, at a first time subsequent to receiving the electronic document, that the first signatory is authorized to electronically sign the document, wherein the absence of signature authority for the first signatory is determined and the first signatory is prevented from electronically signing the electronic document at a second time subsequent to the first time.

5. The method of claim 1, further comprising:
determining, by the electronic signature service, that the second signatory from the organization is authorized for executing the received document, wherein a signature authority of the second signatory is determined from the retrieved organization data; and
electronically providing access to an updated version of the electronic document by at least one computing device associated with the second signatory via a network, wherein the updated version of the electronic document replaces the first signatory with the second signatory.

6. The method of claim 5, wherein determining the second signatory comprises at least one of:
identifying a role in the organization previously associated with the first signatory and determining that the second signatory is currently associated with the role; or
identifying a department in the organization to which the first signatory was previously assigned and determining that the second signatory is currently assigned to the department.

7. The method of claim 5, wherein the second signatory is determined based on analyzing content of the received document.

8. The method of claim 7, wherein determining the second signatory based on analyzing content of the received document comprises:
determining that the analyzed content includes at least one reference to at least one function for which a department of the organization is responsible; and
identifying the second signatory as being at least one entity included in the department.

9. The method of claim 7, wherein determining the second signatory based on analyzing the content of the received document comprises:
determining that the analyzed content references at least one function for which at least one individual having a specified role in the organization is responsible; and
identifying the second signatory as being the at least one individual having the specified role.

10. The method of claim 5, further comprising:
creating multiple electronic documents similar to the electronic document, wherein each of the multiple similar electronic documents involves the first signatory; and
modifying each of the multiple similar electronic documents to omit references to the first signatory and to include the second signatory based on the retrieved organization data.

11. The method of claim 10, further comprising:
storing the organization data separately from the multiple electronic documents; and
altering the organization data to remove the references to the first signatory, wherein the altered organization data is applicable to the multiple similar documents without resending the multiple similar electronic documents to multiple signatories external to the organization.

12. A system comprising:
a processing device; and
a non-transitory computer-readable medium communicatively coupled to the processing device, wherein the processing device is configured for executing program code stored in the non-transitory computer-readable medium to perform operations comprising:
receiving, from a first client device associated with a sender, an electronic document to be electronically signed on behalf of an organization,
retrieving, from a data structure used by the system and stored on the non-transitory computer-readable medium or another non-transitory computer-readable medium, organization data specifying an access right for the electronic document by indicating signatories that are authorized to electronically sign the electronic document, wherein the organization data is inaccessible to a first signatory identifiable from metadata of the electronic document,
determining that the first signatory associated with the electronic document is not authorized to electronically sign the document, wherein an absence of signature authority for the first signatory is determined from the accessed organization data by performing operations comprising:
identifying, from the organizational data, an organizational structure identifying roles for the organization,
identifying, in the organizational data, authorization data specifying a subset of the organizational structure to which an authority to execute the electronic document is limited, and
determining that the organizational data lacks a mapping between the subset of the organizational structure and a user account associated with the first signatory and used for accessing an electronic signature service computing system, and
preventing the first signatory from using a second client device for electronically signing the electronic document based on determining that the first signatory is not authorized to electronically sign the document, wherein preventing the first signatory from electronically signing the electronic document comprises transforming the metadata of the electronic document by removing, from the metadata, an identifier of the first signatory and adding, to the metadata, an identifier of a second signatory.

13. The system of claim 12, wherein preventing the first signatory from electronically signing the electronic document further comprises disabling or restricting the user account that is associated with the first signatory.

14. The system of claim 12, wherein preventing the first signatory from electronically signing the electronic document further comprises rejecting a request to provide access to the electronic document for signature by the first signatory, wherein the request is received from an additional computing device associated with the first signatory.

15. The system of claim 12, wherein the operations further comprise determining that the second signatory from the organization is authorized for executing the received document and electronically providing access to an updated version of the electronic document by at least one computing device associated with the second signatory via a network, wherein the updated version of the electronic document replaces the first signatory with the second signatory, wherein determining the second signatory comprises identifying a role in the organization previously associated with the first signatory and determining that the second signatory is currently associated with the role.

16. The system of claim 12, wherein the operations further comprise determining that the second signatory from the organization is authorized for executing the received document and electronically providing access to an updated version of the electronic document by at least one computing device associated with the second signatory via a network, wherein the updated version of the electronic document replaces the first signatory with the second signatory, wherein determining the second signatory comprises identifying a department in the organization to which the first signatory was previously assigned and determining that the second signatory is currently assigned to the department.

17. A non-transitory computer-readable medium having program code executable by processing device stored thereon, the program code comprising:
   program code for receiving, from a first client device associated with a sender, an electronic document to be electronically signed on behalf of an organization;
   program code for retrieving, a data structure used by an electronic signature service computing system and stored on the non-transitory computer-readable medium or another non-transitory computer-readable medium, organization data specifying an access right for the electronic document by indicating signatories that are authorized to electronically sign the electronic document, wherein the organization data is inaccessible to a first signatory identifiable from metadata of the electronic document;
   program code for determining that the first signatory associated with the electronic document is not authorized to electronically sign the document, wherein an absence of signature authority for the first signatory is determined from the retrieved organization data by performing operations comprising:
      identifying, from the organizational data, an organizational structure identifying roles for the organization,
      identifying, in the organizational data, authorization data specifying a subset of the organizational structure to which an authority to execute the electronic document is limited, and
      determining that the organizational data lacks a mapping between the subset of the organizational structure and a user account associated with the first signatory and used for accessing the electronic signature service computing system; and
   program code for preventing the first signatory from using a second client device for electronically signing the electronic document based on determining that the first signatory is not authorized to electronically sign the document, wherein preventing the first signatory from electronically signing the electronic document comprises transforming the metadata of the electronic document by removing, from the metadata, an identifier of the first signatory and adding, to the metadata, an identifier of a second signatory.

18. The non-transitory computer-readable medium of claim 17, wherein preventing the first signatory from electronically signing the electronic document further comprises disabling or restricting the user account that is associated with the first signatory.

19. The non-transitory computer-readable medium of claim 17, wherein preventing the first signatory from electronically signing the electronic document further comprises rejecting a request to provide access to the electronic document for signature by the first signatory, wherein the request is received from an additional computing device associated with the first signatory.

20. The non-transitory computer-readable medium of claim 17, further comprising:
   program code for determining that the second signatory from the organization is authorized for executing the received document and electronically providing access to an updated version of the electronic document by at least one computing device associated with the second signatory via a network, wherein the updated version of the electronic document replaces the first signatory with the second signatory;
   program code for creating multiple electronic documents similar to the electronic document, wherein each of the multiple similar electronic documents involves the first signatory;
   program code for modifying each of the multiple similar electronic documents to omit references to the first signatory and to include the second signatory based on the accessed organization data;
   program code for storing the organization data separately from the multiple electronic documents; and
   program code for altering the organization data to remove the references to the first signatory, wherein the altered organization data is applicable to the multiple similar documents without resending the multiple similar electronic documents to multiple signatories external to the organization.

* * * * *